United States Patent
Fink et al.

(10) Patent No.: US 9,959,668 B2
(45) Date of Patent: *May 1, 2018

(54) VIRTUAL SURFACE COMPACTION

(71) Applicant: Microsoft Technology Licensing, LLC, Redmond, WA (US)

(72) Inventors: Reiner Fink, Mercer Island, WA (US); Leonardo E. Blanco, Redmond, WA (US); Cenk Ergan, Bellevue, WA (US); Joshua Warren Priestley, Seattle, WA (US); Silvana Patricia Moncayo, Seattle, WA (US); Blake D. Pelton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/930,456

(22) Filed: Nov. 2, 2015

(65) Prior Publication Data

US 2016/0189424 A1   Jun. 30, 2016

Related U.S. Application Data

(63) Continuation of application No. 13/485,815, filed on May 31, 2012, now Pat. No. 9,177,533.

(51) Int. Cl.
*G06T 17/00* (2006.01)
*G06T 17/10* (2006.01)
(Continued)

(52) U.S. Cl.
CPC .............. *G06T 17/10* (2013.01); *G06T 15/04* (2013.01); *G06T 17/20* (2013.01); *G09G 5/393* (2013.01); *G09G 5/346* (2013.01);
*G09G 5/399* (2013.01); *G09G 2340/045* (2013.01); *G09G 2340/0407* (2013.01); *G09G 2340/12* (2013.01);
(Continued)

(58) Field of Classification Search
None
See application file for complete search history.

(56) References Cited

U.S. PATENT DOCUMENTS 5,247,674 A    9/1993  Kogure
5,270,103 A    12/1993 Oliver et al.
(Continued)

FOREIGN PATENT DOCUMENTS

AU    2011101579 A4   2/2012
CN    1806258 A       7/2006
(Continued)

OTHER PUBLICATIONS

"First Office Action and Search Report Issued in Chinese Patent Application No. 201310211997.0", dated Oct. 10, 2015, 14 Pages.
(Continued)

*Primary Examiner* — Anh-Tuan V Nguyen
(74) *Attorney, Agent, or Firm* — Arent Fox LLP

(57) ABSTRACT

Virtual surface update and composition techniques are described. These techniques include support of initialization and batching of updates, use of updates and lookaside lists, use of gutters, blending and BLT operations, surface optimization techniques such as push down as well as enumeration and clumping, mesh usage, and occlusion management techniques.

16 Claims, 21 Drawing Sheets

(51) Int. Cl.
  *G09G 5/393* (2006.01)
  *G06T 15/04* (2011.01)
  *G06T 17/20* (2006.01)
  *G09G 5/34* (2006.01)
  *G09G 5/399* (2006.01)

(52) U.S. Cl.
  CPC . *G09G 2360/121* (2013.01); *G09G 2360/122* (2013.01); *G09G 2360/127* (2013.01)

(56) References Cited

U.S. PATENT DOCUMENTS

| | | |
|---|---|---|
| 5,564,002 A | 10/1996 | Brown |
| 5,588,071 A | 12/1996 | Schultz |
| 5,590,327 A | 12/1996 | Biliris et al. |
| 5,696,675 A | 12/1997 | Nakamura et al. |
| 5,729,704 A | 3/1998 | Stone et al. |
| 5,781,195 A | 7/1998 | Marvin |
| 5,784,699 A | 7/1998 | McMahon et al. |
| 5,801,717 A | 9/1998 | Engstrom et al. |
| 5,841,439 A | 11/1998 | Pose et al. |
| 5,844,569 A | 12/1998 | Eisler et al. |
| 5,870,769 A | 2/1999 | Freund |
| 5,918,239 A | 6/1999 | Allen et al. |
| 5,986,670 A | 11/1999 | Dries et al. |
| 6,067,093 A | 5/2000 | Grau et al. |
| 6,091,422 A | 7/2000 | Ouaknine et al. |
| 6,182,133 B1 | 1/2001 | Horvitz |
| 6,191,796 B1 | 2/2001 | Tarr |
| 6,226,017 B1 | 5/2001 | Goossen et al. |
| 6,236,410 B1 | 5/2001 | Politis et al. |
| 6,249,289 B1 | 6/2001 | Arnaud et al. |
| 6,330,003 B1 | 12/2001 | Curtis et al. |
| 6,335,765 B1 | 1/2002 | Daly et al. |
| 6,344,855 B1 | 2/2002 | Fisher et al. |
| 6,411,302 B1 | 6/2002 | Chiraz |
| 6,426,750 B1 | 7/2002 | Hoppe |
| 6,501,474 B1 | 12/2002 | Thomson et al. |
| 6,504,545 B1 | 1/2003 | Browne et al. |
| 6,525,722 B1 | 2/2003 | Deering |
| 6,809,745 B1 | 10/2004 | O'Donnell et al. |
| 6,850,967 B1 | 2/2005 | Spencer et al. |
| 6,864,886 B1 | 3/2005 | Cavallaro et al. |
| 6,900,813 B1 | 5/2005 | Stefanidis |
| 7,031,517 B1 | 4/2006 | Le et al. |
| 7,102,635 B2 | 9/2006 | Shih et al. |
| 7,127,592 B2 | 10/2006 | Abraham et al. |
| 7,130,890 B1 | 10/2006 | Kumar et al. |
| 7,133,054 B2 | 11/2006 | Aguera y Arcas |
| 7,307,631 B2 | 12/2007 | Robart |
| 7,342,580 B1 | 3/2008 | Peterson |
| 7,400,322 B1 | 7/2008 | Urbach |
| 7,511,718 B2 | 3/2009 | Subramanian et al. |
| 7,535,480 B2 * | 5/2009 | Hartman ............... G06T 15/503 345/419 |
| 7,594,093 B1 | 9/2009 | Kancherla |
| 7,667,715 B2 | 2/2010 | MacInnis et al. |
| 7,738,688 B2 | 6/2010 | Eichhorn et al. |
| 7,792,876 B2 | 9/2010 | Easwar |
| 7,877,708 B2 | 1/2011 | Zinn et al. |
| 7,941,758 B2 | 5/2011 | Tremblay |
| 8,010,624 B2 | 8/2011 | Scott et al. |
| 8,161,087 B2 | 4/2012 | Latzina |
| 8,255,818 B2 | 8/2012 | Bales et al. |
| 8,284,211 B2 | 10/2012 | Darsa et al. |
| 8,306,399 B1 | 11/2012 | Trottier et al. |
| 8,307,300 B1 | 11/2012 | Fisher et al. |
| 8,314,809 B1 | 11/2012 | Grabowski et al. |
| 8,341,245 B1 | 12/2012 | Roskind et al. |
| 8,438,474 B1 | 5/2013 | Lloyd |
| 8,549,421 B2 | 10/2013 | Gohda et al. |
| 2002/0005854 A1 | 1/2002 | Deering et al. |
| 2002/0005891 A1 | 1/2002 | Wilson et al. |
| 2002/0015042 A1 | 2/2002 | Robotham et al. |
| 2002/0049819 A1 | 4/2002 | Matsuda et al. |
| 2002/0075327 A1 | 6/2002 | Stall |
| 2002/0089547 A1 | 7/2002 | Huapaya |
| 2002/0094125 A1 | 7/2002 | Guo |
| 2002/0110057 A1 | 8/2002 | Kadlec et al. |
| 2002/0163530 A1 | 11/2002 | Takakura et al. |
| 2002/0163542 A1 | 11/2002 | Costea et al. |
| 2003/0001847 A1 | 1/2003 | Doyle et al. |
| 2003/0020719 A1 | 1/2003 | Abgrall |
| 2003/0091232 A1 | 5/2003 | Kalevo et al. |
| 2003/0189597 A1 | 10/2003 | Anderson et al. |
| 2003/0227460 A1 | 12/2003 | Schinnerer |
| 2003/0229605 A1 | 12/2003 | Herrera et al. |
| 2004/0003188 A1 | 1/2004 | Rao |
| 2004/0008212 A1 | 1/2004 | O'Neill |
| 2004/0107380 A1 | 6/2004 | Vollschwitz |
| 2004/0150647 A1 | 8/2004 | Aleksic et al. |
| 2004/0160446 A1 | 8/2004 | Gosalia et al. |
| 2004/0160449 A1 | 8/2004 | Gossalia et al. |
| 2004/0162930 A1 | 8/2004 | Forin et al. |
| 2004/0174385 A1 * | 9/2004 | Ikeda ..................... G09G 5/14 345/629 |
| 2004/0189668 A1 | 9/2004 | Beda et al. |
| 2004/0212619 A1 | 10/2004 | Saito et al. |
| 2005/0035980 A1 | 2/2005 | Lonsing |
| 2005/0050297 A1 | 3/2005 | Essick et al. |
| 2005/0071777 A1 | 3/2005 | Roessler et al. |
| 2005/0088447 A1 | 4/2005 | Hanggie et al. |
| 2005/0140683 A1 | 6/2005 | Collins et al. |
| 2005/0172098 A1 | 8/2005 | Worley |
| 2005/0190178 A1 | 9/2005 | Taghavi et al. |
| 2005/0235124 A1 | 10/2005 | Pomaranski et al. |
| 2005/0283566 A1 | 12/2005 | Callaghan |
| 2006/0107229 A1 | 5/2006 | Matthews et al. |
| 2006/0200778 A1 | 9/2006 | Gritzman et al. |
| 2006/0248469 A1 | 11/2006 | Czerwinski et al. |
| 2006/0290705 A1 | 12/2006 | White et al. |
| 2007/0013708 A1 | 1/2007 | Barcklay et al. |
| 2007/0018992 A1 | 1/2007 | Wong |
| 2007/0035543 A1 | 2/2007 | David et al. |
| 2007/0040788 A1 | 2/2007 | Saha |
| 2007/0047760 A1 | 3/2007 | Sharma et al. |
| 2007/0088768 A1 | 4/2007 | Passerini et al. |
| 2007/0091098 A1 | 4/2007 | Zhang et al. |
| 2007/0101066 A1 | 5/2007 | Al Sukhni et al. |
| 2007/0113194 A1 | 5/2007 | Bales et al. |
| 2007/0133900 A1 | 6/2007 | Nielsen et al. |
| 2007/0154087 A1 | 7/2007 | Cho et al. |
| 2007/0291044 A1 | 12/2007 | Xu et al. |
| 2008/0001962 A1 | 1/2008 | Lefebvre et al. |
| 2008/0040568 A1 | 2/2008 | Bhattacharya |
| 2008/0100613 A1 | 5/2008 | Woo et al. |
| 2008/0136840 A1 | 6/2008 | Chang et al. |
| 2008/0140981 A1 | 6/2008 | Kim |
| 2008/0165268 A1 | 7/2008 | Takahashi et al. |
| 2008/0166033 A1 | 7/2008 | Bueno et al. |
| 2008/0198168 A1 | 8/2008 | Jiao et al. |
| 2008/0235292 A1 | 9/2008 | Janin et al. |
| 2008/0238928 A1 | 10/2008 | Poddar et al. |
| 2008/0244458 A1 | 10/2008 | Brugiolo et al. |
| 2008/0285074 A1 | 11/2008 | Wilson |
| 2008/0291201 A1 | 11/2008 | Lafon |
| 2008/0298689 A1 | 12/2008 | Ashbrook et al. |
| 2009/0102842 A1 | 4/2009 | Li |
| 2009/0129635 A1 | 5/2009 | Abe |
| 2009/0141895 A1 | 6/2009 | Anderson et al. |
| 2009/0172331 A1 | 7/2009 | Vembu et al. |
| 2009/0208110 A1 | 8/2009 | Hoppe et al. |
| 2009/0210482 A1 | 8/2009 | Wynn et al. |
| 2009/0213081 A1 | 8/2009 | Case, Jr. |
| 2009/0213112 A1 | 8/2009 | Zhu et al. |
| 2009/0262122 A1 | 10/2009 | Darsa et al. |
| 2009/0284537 A1 | 11/2009 | Hong et al. |
| 2009/0322764 A1 | 12/2009 | Saini et al. |
| 2010/0011316 A1 | 1/2010 | Sar et al. |
| 2010/0042945 A1 | 2/2010 | Bauchot et al. |
| 2010/0073379 A1 | 3/2010 | Berger et al. |
| 2010/0079480 A1 | 4/2010 | Murtagh |
| 2010/0162126 A1 | 6/2010 | Donaldson et al. |

(56) References Cited

U.S. PATENT DOCUMENTS

| | | | |
|---|---|---|---|
| 2010/0169059 A1* | 7/2010 | Thomas-Lepore | G06F 17/50 703/1 |
| 2010/0169310 A1 | 7/2010 | Latzina | |
| 2010/0207957 A1 | 8/2010 | Taneja et al. | |
| 2010/0277504 A1 | 11/2010 | Song | |
| 2010/0278442 A1 | 11/2010 | Parsons et al. | |
| 2010/0281402 A1 | 11/2010 | Staikos et al. | |
| 2010/0289806 A1 | 11/2010 | Lao et al. | |
| 2010/0293504 A1 | 11/2010 | Hachiya | |
| 2010/0309205 A1 | 12/2010 | Novosad | |
| 2010/0313125 A1 | 12/2010 | Fleizach et al. | |
| 2010/0315319 A1 | 12/2010 | Cok et al. | |
| 2010/0321377 A1 | 12/2010 | Gay et al. | |
| 2010/0325589 A1 | 12/2010 | Ofek et al. | |
| 2011/0022984 A1 | 1/2011 | van der Meulen et al. | |
| 2011/0043553 A1 | 2/2011 | Brown et al. | |
| 2011/0069881 A1 | 3/2011 | Kitago | |
| 2011/0072391 A1 | 3/2011 | Hanggie et al. | |
| 2011/0078624 A1 | 3/2011 | Missig et al. | |
| 2011/0102440 A1 | 5/2011 | Yuen et al. | |
| 2011/0109642 A1* | 5/2011 | Chang | G06T 11/60 345/589 |
| 2011/0138314 A1 | 6/2011 | Mir et al. | |
| 2011/0141123 A1 | 6/2011 | Kumar et al. | |
| 2011/0154248 A1 | 6/2011 | Tsuruoka | |
| 2011/0173569 A1 | 7/2011 | Howes et al. | |
| 2011/0199377 A1 | 8/2011 | Jang et al. | |
| 2011/0252299 A1 | 10/2011 | Lloyd et al. | |
| 2011/0267370 A1 | 11/2011 | Tanaka | |
| 2011/0304699 A1 | 12/2011 | Ito et al. | |
| 2012/0042252 A1 | 2/2012 | Neerudu et al. | |
| 2012/0050313 A1* | 3/2012 | Gruber | G06T 11/00 345/606 |
| 2012/0081353 A1 | 4/2012 | Yusupov et al. | |
| 2012/0081368 A1 | 4/2012 | Park et al. | |
| 2012/0092335 A1 | 4/2012 | Kim et al. | |
| 2012/0102034 A1 | 4/2012 | Kim et al. | |
| 2012/0115600 A1 | 5/2012 | Dietrich et al. | |
| 2012/0151308 A1 | 6/2012 | Falkenberg et al. | |
| 2012/0188342 A1 | 7/2012 | Gervautz et al. | |
| 2012/0206471 A1* | 8/2012 | Sarnoff | G06T 11/60 345/581 |
| 2012/0213435 A1 | 8/2012 | Donovan et al. | |
| 2012/0218381 A1 | 8/2012 | Uro et al. | |
| 2012/0229464 A1 | 9/2012 | Fishwick | |
| 2012/0235933 A1 | 9/2012 | Yamamura et al. | |
| 2012/0249741 A1 | 10/2012 | Maciocci et al. | |
| 2012/0251003 A1 | 10/2012 | Perbet et al. | |
| 2012/0254780 A1 | 10/2012 | Mouton et al. | |
| 2012/0324043 A1 | 12/2012 | Burkard et al. | |
| 2013/0007260 A1 | 1/2013 | Jain et al. | |
| 2013/0007590 A1 | 1/2013 | Rivera et al. | |
| 2013/0019159 A1 | 1/2013 | Civelli et al. | |
| 2013/0021262 A1 | 1/2013 | Chen | |
| 2013/0050249 A1 | 2/2013 | Grabowski et al. | |
| 2013/0069981 A1* | 3/2013 | Mak-Fan | G09G 5/14 345/629 |
| 2013/0073509 A1 | 3/2013 | Burkard et al. | |
| 2013/0073670 A1 | 3/2013 | Das et al. | |
| 2013/0074080 A1 | 3/2013 | Jimenez | |
| 2013/0093750 A1 | 4/2013 | Cornell et al. | |
| 2013/0147787 A1* | 6/2013 | Ignatchenko | G06T 11/60 345/419 |
| 2013/0208012 A1 | 8/2013 | Ergan et al. | |
| 2013/0321453 A1 | 12/2013 | Fink et al. | |
| 2013/0321454 A1 | 12/2013 | Fink et al. | |
| 2013/0321455 A1 | 12/2013 | Fink et al. | |
| 2014/0372511 A1 | 12/2014 | Kapadia et al. | |

FOREIGN PATENT DOCUMENTS

| | | |
|---|---|---|
| CN | 101874233 A | 10/2010 |
| CN | 102044191 A | 5/2011 |
| WO | 9522104 A1 | 8/1995 |
| WO | 2011037966 A2 | 3/2011 |

OTHER PUBLICATIONS

"Second Office Action and Search Report Issued in Chinese Patent Application No. 201310211997.0", Dated May 27, 2016, 10 Pages.

"Copying Render Options", Retrieved from <<http://download.autodesk.com/global/docs/softimage2013/en_us/userguide/index.html?url=files/renderoptions_managing_CopyingRenderOptions_htm,topicNumber=d28e375988>>, Feb. 9, 2012, 3 Pages.

"Desktop Window Manager", Retrieved From <<http://en.wikipedia.org/wiki/windex.php?title=Desktop_window_manager&oldid=425547889#External_links>>, Jun. 3, 2014, 5 Pages.

"File Explorer", Retrieved From <<http://en.wikipedia.org/w/index.php?title=File_Explorer&oldid=425043676>>, Apr. 20, 2011, Apr. 20, 2011, 13 Pages.

"IDCompositionVirtualSurface: Trim method", Retrieved From <<http://msdn.microsoft.com/en-us/library/windows/desktop/hh449137(v=vs.85).aspx>>, Jun. 15, 2012, 2 Pages.

"Open GL Programming Guide", The Official Guide to Learning Open, GL, Versions 3.0 and 3.1. Addison-Wesley, Jul., 2009, 1019 Pages.

"Polygon Modeling", Retrieved from <<https://en.wikipedia.org/wiki/Polygonal_modeling>> Mar., 2012, 6 Pages.

"Shading OpenGL Shaders", Retrieved From <<http://www.sidefx.com/docs/houdini9.5/shade/opengl>>, Feb. 9, 2012, 7 Pages.

"Spaces (Software)", Retrieved From <<https://en.wikipedia.org/w/index.php?title=Spaces_%28software%29&oldid=467135782>>, Jun. 2, 2014, 3 Pages.

"Viewing Virtual Surface Aids Reclassification", Retrieved From <<http://www.microimages.com/documentation/TechGuides/77LASsurfReclas.pdf>>, Oct. 2010, 2 Pages.

"Working with Rendering Contexts", Retrieved From <<https://developer.apple.com/library/mac/documentation/GraphicsImaging/Conceptual/OpenGL-MacProgGuide/opengl_contexts/opengl_contexts.html>>, Jan. 2010, 9 Pages.

"Final Office Action Issued in U.S. Appl. No. 13/397,299", Dated May 13, 2015, 19 Pages.

"Non-Final Office Action Issued in U.S. Appl. No. 13/397,299", Dated Nov. 6, 2014, 28 Pages.

"Non-Final Office Action Issued in U.S. Appl. No. 13/397,299", Dated May 14, 2014, 20 Pages.

"Final Office Action Issued in U.S. Appl. No. 13/485,805", Dated Mar. 24, 2015, 35 Pages.

"Final Office Action Issued in U.S. Appl. No. 13/485,805", Dated Jun. 26, 2014, 30 Pages.

"Non-Final Office Action Issued in U.S. Appl. No. 13/485,805", Dated Dec. 19, 2013, 28 Pages.

"Non-Final Office Action Issued in U.S. Appl. No. 13/485,805", Dated Nov. 6, 2014, 34 Pages.

"Final Office Action Issued in U.S. Appl. No. 13/485,815", Dated Nov. 19, 2014, 24 Pages.

"Final Office Action Issued in U.S. Appl. No. 13/485,815", Dated Jun. 11, 2014, 18 Pages.

"Non-Final Office Action Issued in U.S. Appl. No. 13/485,815", Dated Apr. 23, 2015, 32 Pages.

"Non-Final Office Action Issued in U.S. Appl. No. 13/485,815", Dated Sep. 23, 2014, 20 Pages.

"Non-Final Office Action Issued in U.S. Appl. No. 13/485,815", Dated Dec. 18, 2013, 16 Pages.

"Notice of Allowance Issued in U.S. Appl. No. 13/485,815", Dated Jul. 16, 2015, 11 Pages.

"Notice of Allowance Received in U.S. Appl. No. 13/485,815", Dated Sep. 30, 2015, 2 Pages.

"Final Office Action Issued in U.S. Appl. No. 13/485,825", Dated Jun. 12, 2014, 19 Pages.

(56) References Cited

OTHER PUBLICATIONS

"Final Office Action Issued in U.S. Appl. No. 13/485,825", Dated Jan. 26, 2015, 35 Pages.
"Non-Final Office Action Issued in U.S. Appl. No. 13/485,825", Dated Oct. 2, 2014, 29 Pages.
"Non-Final Office Action Issued in U.S. Appl. No. 13/485,825", Dated Jan. 30, 2014, 18 Pages.
"Notice of Allowance Issued in U.S. Appl. No. 13/485,825", Dated Aug. 28, 2015, 8 Pages.
"Supplemental Notice of Allowance Issued in U.S. Appl. No. 13/485,825", Dated Sep. 30, 2015, 2 Pages.
"Final Office Action Issued in U.S. Appl. No. 13/485,832", Dated Apr. 22, 2014, 20 Pages.
"Final Office Action Issued in U.S. Appl. No. 13/485,832", Dated Aug. 26, 2014, 24 Pages.
"Final Office Action Issued in U.S. Appl. No. 13/485,832", Dated Apr. 3, 2015, 43 Pages.
"Non-Final Office Action Issued in U.S. Appl. No. 13/485,832", Dated Nov. 28, 2014, 29 Pages.
"Non-Final Office Action Issued in U.S. Appl. No. 13/485,832", Dated Jun. 2, 2014, 20 Pages.
"Non-Final Office Action Issued in U.S. Appl. No. 13/485,832", Dated Dec. 19, 2013, 21 Pages.
"Notice of Allowance Issued in U.S. Appl. No. 13/485,832", Dated Aug. 28, 2015, 8 Pages.
"Supplemental Notice of Allowance Issued in U.S. Appl. No. 13/485,832", Dated Sep. 24, 2015, 2 Pages.
"Final Office Action Issued in U.S. Appl. No. 13/918,869", Dated Jul. 14, 2015, 9 Pages.
"Non-Final Office Action Issued in U.S. Appl. No. 13/918,869", Dated Mar. 30, 2015, 13 Pages.
"Supplementary Search Report Issued in European Patent Application No. 13749288.0", Dated Jun. 19, 2015, 8 Pages.
"First Office Action Issued in Chinese Patent Application No. 201310211623.9", Dated Aug. 31, 2015, 7 Pages.
"First Office Action Issued in Chinese Patent Application No. 201310211477.X", Dated May 5, 2015, 16 Pages.
"Compositing Window Manager", Retrieved From <<http://en.wikipedia.org/w/index.php?title=Compositing_window_manager&oldid=492324820>>, Jul. 1, 2014, 11 Pages.
Corbet, et al., "Linux Device Drivers", In Proceedings of the Third Edition, Chapter 8—Allocating Memory, Feb., 2005, 23 Pages.
"Google Adds Voice Search, Visual Search and Results Prerendering", Retrieved From <<https://googlesystem.blogspot.in/2011/06/google-adds-voice-search-visual-search.html#gsc.tab=0>>, Jun. 14, 2011, 6 Pages.
Junkie, Gui, "Tabbed browsing—Why close the application on closing the last tab?", Retrieved From <<https://ux.stackexchange.com/questions/10598/tabbed-browsing-why-close-the-application-on-closing-the-last-tab>>, Aug. 28, 2011, 3 Pages.
Lentell, Gour, "Amazon Silk and Cloud Browsers", Retrieved from <<https://web.archive.org/web/20111022081022/http://www.binu.com/2011/09/amazon-silk-and-cloud-browsers/>>, Sep. 30, 2011, 3 pages.
Miles, et al., "The Forger's Win32 API Programming Tutorial—A Simple Window", Retrieved From <<https://web.archive.org/web/20100211130846/http://www.winprog.org/tutorial/simple_window.html>>, Mar. 24, 2015, 5 Pages.
Moreland, et al., "Sort-Last Parallel Rendering for Viewing Extremely Large Data Sets on Tile Displays", In Proceedings of the IEEE 2001 Symposium on Parallel and Large-Data Visualization and Graphics, Oct. 22, 2001, pp. 85-93.
"International Search Report and Written Opinion Issued in PCT Patent Application No. PCT/US2013/023354", Dated May 16, 2013, 10 Pages.
"International Search Report & Written Opinion Issued in PCT Application No. PCT/US2013/041485", Dated Oct. 11, 2013, 16 Pages.
"International Search Report & Written Opinion for PCT Application No. PCT/US2013/061010", Dated Aug. 20, 2014, 11 Pages.
"Second Written Opinion Issued in PCT Application No. PCT/US2013/061010", Dated Jun. 25, 2015, 7 Pages.
Shade, et al., "Tiling Layered Depth Images", In Proceedings of the 27th Internationsl Conference on Computer Graphics and Interactive Techniques Conference, Jul. 23, 2000, 10 Pages.

* cited by examiner

1400

1402
Receive a request by a composition system to allocate a surface in which to render one or more visuals, the request specifying a size of the surface

1404
Responsive to the receipt of the request, allocate the surface by the composition system to have a size that is greater than the size requested to render the one or more visuals

1502
Manage surfaces by a composition system including visuals for display by a display device 1504
Track valid regions within the surfaces that are to be displayed by the display device

1802
Track valid regions of a plurality of surfaces that are usable by a composition system to render one or more visuals

1804
Determine by the composition system that a first valid region of a first surface is includable within an allocation of a second surface

1806
Push down the first valid region for inclusion as part of the second surface

2002
Form a mesh out of a set of rectangles that does not include T-junctions

2004
Make a call to a driver to render a surface using the mesh

*Fig. 20*

VIRTUAL SURFACE COMPACTION

RELATED APPLICATION

This application is a continuation of U.S. patent application Ser. No. 13/485,815, filed May 31, 2012, entitled "Virtual Surface Compaction", the entire disclosure of which is hereby incorporated by reference herein in its entirety.

BACKGROUND

The variety of computing device configurations continues to increase. From traditional desktop personal computers to mobile phones, game consoles, set-top boxes, tablet computers, and so on, the functionality available from each of these configurations may vary greatly.

Consequently, traditional display techniques that were developed for one configuration may not be as well suited for another configuration. For example, display techniques that were previously utilized for devices having significant memory resources may be ill-suited for devices having fewer resources.

SUMMARY

Virtual surface techniques are described. These techniques include support of initialization and batching of updates, use of updates and lookaside lists, use of gutters, blending and BLT operations, surface optimization techniques such as push down as well as enumeration and clumping, mesh usage, and occlusion management techniques.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 14 is a flow diagram depicting a procedure in an example implementation in which a size is allocated for a surface in which to render data.

FIG. 15 is a flow diagram depicting a procedure in an example implementation in which valid regions are tracked by the composition system.

FIG. 18 is a flow diagram depicting a procedure in an example implementation in which a compaction technique is described that involves push down of a valid region from one surface to another.

FIG. 20 is a flow diagram depicting a procedure in an example implementation in which a composition system employs a mesh to make a call to a driver to render of surface using the mesh.

DETAILED DESCRIPTION

Overview

Virtual surfaces may be used to allocate and manage surfaces for rendering of visuals. The virtual surfaces, for instance, may be used to overcome limitations of hardware, such as to manage rendering of a webpage that is larger than memory that may be allocated by the hardware for rendering of the visuals, such as to manage a large webpage, immersive application, and so on.

Virtual surface composition and update techniques are described herein. In one or more implementations, techniques are described to manage surfaces for rendering. This includes techniques to support initialization and batching of updates as further described in relation to FIGS. 4 and 5, use of updates and lookaside lists as described in relation to FIGS. 6 and 7, use of gutters as described in relation to FIG. 8, blending and BLT operations as described in relation to FIG. 9, surface optimization techniques such as push down as described in relation to FIG. 10 as well as enumeration and clumping as described in relation to FIG. 11, mesh usage as described in relation to FIG. 12, and occlusion management techniques as described in relation to FIG. 13.

In the following discussion, an example environment is first described that is operable to perform virtual surface techniques described herein. Examples procedures are then described, which are operable in the example environment as well as in other environments. Likewise, the example environment is not limited to performance of the example procedures.

Example Environment

Figure 1:
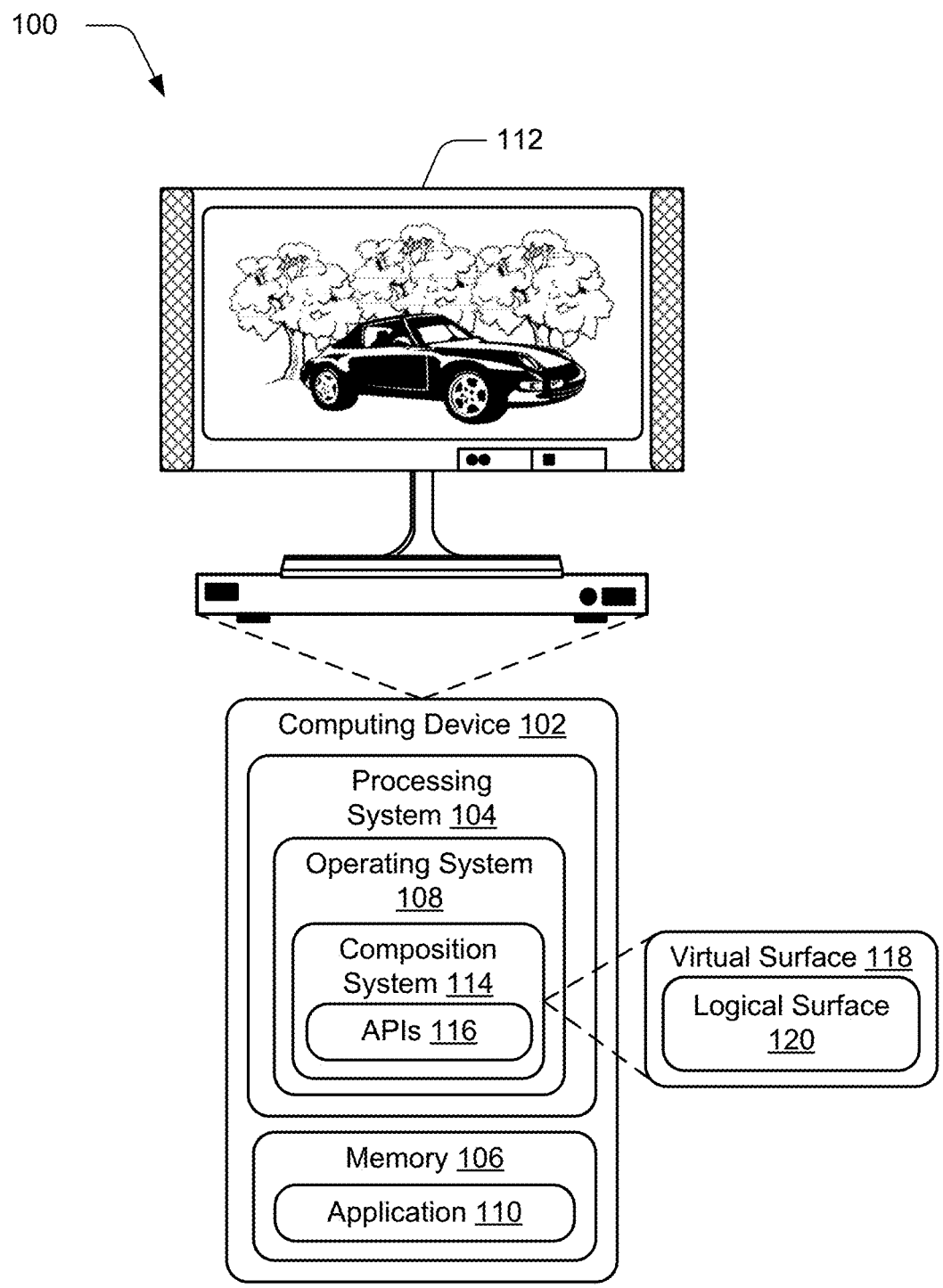
FIG. 1 is an illustration of an environment in an example implementation that is operable to perform virtual surface techniques described herein.

FIG. 1 illustrates an operating environment in accordance with one or more embodiments, generally at 100. Environment 100 includes a computing device 102 having a processing system 104 that may include one or more processors, an example of computer-readable storage media illustrated as memory 106, an operating system 108, and one or more applications 110. Computing device 102 can be embodied as any suitable computing device such as, by way of example and not limitation, a desktop computer, a portable computer, a handheld computer such as a personal digital assistant (PDA), mobile phone, tablet computer, and the like. Different examples of a computing device 102 is shown and described below in FIG. 21.

The computing device 102 also includes an operating system 108 that is illustrated as being executed on the processing system 104 and is storable in memory 106. The computing device 102 further includes applications 110 that are illustrated as being stored in the memory 106 and are also executable on the processing system 104. The operating system 108 is representative of functionality of the computing device 102 that may abstract underlying hardware and software resources for use by the applications 110. For example, the operating system 108 may abstract functionality of how data is displayed on the display device 112 without the applications 110 having to "know" how this display is achieved. A variety of other examples are also contemplated, such as to abstract the processing system 104 and memory 106 resources of the computing device 102, network resources, and so on.

The computing device 102 is also illustrated as including a composition system 114. Although illustrated as part of the operating system 108, the composition system 114 may be implemented in a variety of ways, such as a stand-alone module, as a separate application, as part of hardware of the computing device 102 itself (e.g., a SOC or ASIC), and so on. The composition system 114 may employ a variety of techniques to render visuals, such as to expose functionality via one or more application programming interfaces (APIs) 116 for use by the applications 110 to render visuals.

For example, one such technique may be based on an object called a swap chain, which may leverage an array of buffers representing a bitmap. One of the buffers, for instance, may be used to present data on the display device 112 at any one time and therefore may be called the "onscreen buffer" or "front buffer." The other buffers are made available to an application 110 for rasterization off screen and therefore may be referred to as an "off-screen buffer" or "back buffer."

An application 110 may make a change to what is displayed on the display device 112 in a variety of ways. In a first such technique, the application 110 can redraw one of the back buffers and "flip" the contents, such as by making one of the off-screen buffers the onscreen buffer using a pointer and vice versa.

In a second such technique, buffers of different sizes may also be leveraged. For example, the composition system 114 may leverage a first buffer as an onscreen buffer. The composition system 114 may also leverage a second buffer that is smaller than the first buffer as an off-screen buffer. Therefore, when an update is to be made to the content, the update may be rasterized to the second buffer. The update may then be copied to the onscreen buffer, e.g., using a blt. In this way, resources of the computing device 102 may be conserved.

The composition system 114 may also be configured to support virtual surface techniques. These techniques may be used to assist developers of the applications 110 to reduce resources of the computing device 102 that are used to render visuals. This may include use of virtual surfaces 118, thereby enabling applications 110 to break a surface of visual data into tiles and then render the tiles ahead of time. Other implementations are also contemplated in which tiles are not used to portion the surface (e.g., the application 110 specifies a size) as further described below.

A virtual surface 118 may be configured as a collection of one or more logical surfaces 120. The logical surface 120 is representative of an individual surface as seen by the application 110 and may be associated with one or more visuals. The logical surface 120, for instance, may be configured as tiles having a fixed size and a plurality of which may be arranged in a fixed grid, although it should be readily apparent that a variety of other instances are also contemplated in which tiles are not utilized in a fixed size. For example, a size of the tiles may be specified by an application that wishes to render a visual and therefore the size of the tile in this instance may be set by the application itself, which are also referred to as "chunks" in the following discussion.

The virtual surface 118 may be used to represent an area that is larger than an area represented by a texture. For example, the application 110 may specify a size of a virtual texture at creation time. The size establishes the boundaries for the virtual surface 118. The surface can be associated with one or multiple visuals. In one or more implementations, when a virtual surface is first initialized, it is not backed by actual allocations. In other words, the virtual surface 118 may not "hold bits" upon initialization but may do so at a later point in time, e.g., upon allocation.

In the following discussion, a visual may refer to a basic composition element. For example, a visual may contain a bitmap and associated compositional metadata for processing by the composition system 114. A visual's bitmap can be associated with a swap chain (e.g., for dynamic content such as video) or an atlas surface (e.g., for semi-dynamic content). The two presentation models may be supported in a single visual tree that is supported by the composition system 114.

For semi-dynamic content, an atlas may serve as the updating model for the visual's bitmap and may refer to an aggregate layer which may include a plurality of layers to be rendered, although a single layer is also contemplated. The visual and its property manipulations (e.g. offset, transform, effect, and so on) as well as the methods to update the visual's atlas-based-bitmaps (BeginDraw, SuspendDraw, ResumeDraw, EndDraw) are exposed via application programming interfaces 116, whereas the atlas layer size, tiles size, packing/compaction/management of bitmap updates may be hidden from the application 110.

A swap chain refers to a series of buffers that may "flip" to the screen on after another, such as by changing pointers. Accordingly, a flip mode is a mode by which a swap chain technique is used to make an off-screen buffer an onscreen buffer, e.g., through the use of swapping points between the off-screen and onscreen buffers. However, a blt mode refers to a technique in which a runtime of the composition system 114 issues a "blt" (e.g., bit block image transfer) from an off-screen buffer to an onscreen buffer, which may be used to update the onscreen buffer.

As previously described, when a virtual surface 118 is first initialized in one or more implementations, it is not backed by actual allocations. In other words, it does not "hold any bits." The composition system 114 may perform allocation of tiles (i.e., composition surface objects) once the application 110 starts updating the surface. The application 110 can update the virtual surface 118 via a variety of operations, such as begin draw, suspend draw, resume draw, and end draw API calls to respective operations. The mapping may be determined by an internal algorithm of the composition system 114 and is not made visible to the application 110 in one or more implementations.

Additionally, the composition system 114 may expose functionality via APIs 116 to enable applications 110 to resize and trim a virtual surface 118. For example, a resize operation may be used to change the boundaries of the virtual surface 118. This means that new updates and/or allocations are to fall within the boundaries set by the new size. The application 110 may also use this method to inform the composition system 114 that a region of the virtual surface 118 is no longer being utilized (e.g., not valid) and thus is available for reclamation. If the resize results in shrinking the area, the application 110 is no longer be able to make updates to the regions outside of the new boundaries through management by the composition system 114.

Figure 2:
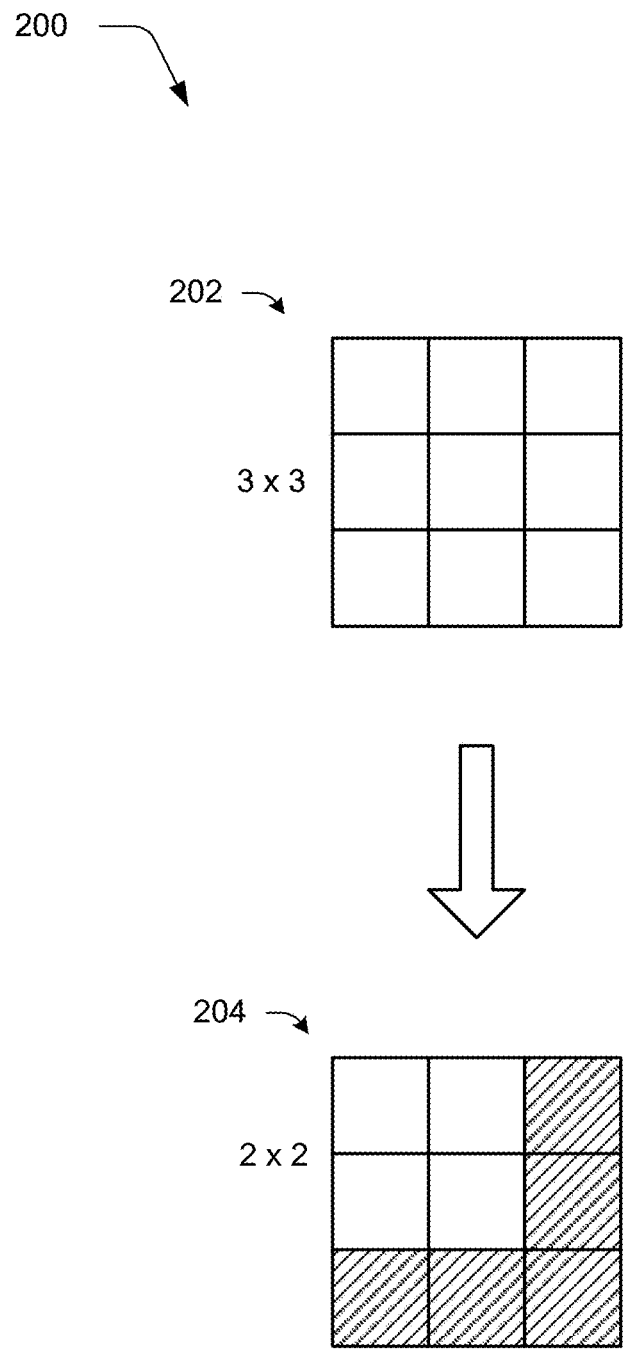
FIG. 2 depicts an example implementation in which a virtual surface is resized.

FIG. 2 depicts an example implementation 200 in which a virtual surface is resized. In the illustrated example, first and second stages 202, 204 are used to show that a 3×3 virtual surface is resized to 2×2, respectively. The regions that contain cross-hatching in the second stage 204 represent tiles that are to be discarded as part of the resize operation. As mentioned before, the memory 106 used to store these tiles may then be reclaimed by the composition system 114. After the resize, the application 110 will no longer be able to make updates to the discarded region (i.e., the cross-hatched region) without first resizing the virtual surface again.

Additionally, the resize operation may be initiated by the composition system 114 in response to receipt of indication of the operation in one or more implementations. For example, the composition system 114 may implement resize updates upon receipt of the indication without waiting for the application to call "commit." For example, an application may call "Resize(0, 0)," "Resize(INT_MAX, INT_MAX)," and "Commit( )." In this example, the application 110 has caused the content to be discarded on the first resize, so the second resize does not have an effect even though it was called before "Commit( )." In this case, the display device 112 does not display content as none is available for display.

A trim operation may be used to describe a region of a virtual atlas to the composition system 114 that is requested by the application 110. Thus, the trim operation may be performed without resizing boundaries of the virtual surface 118. However, it does tell the composition engine 114 which logical surfaces are to be allocated at present, an example of which is described in relation to the following figure.

Figure 3:
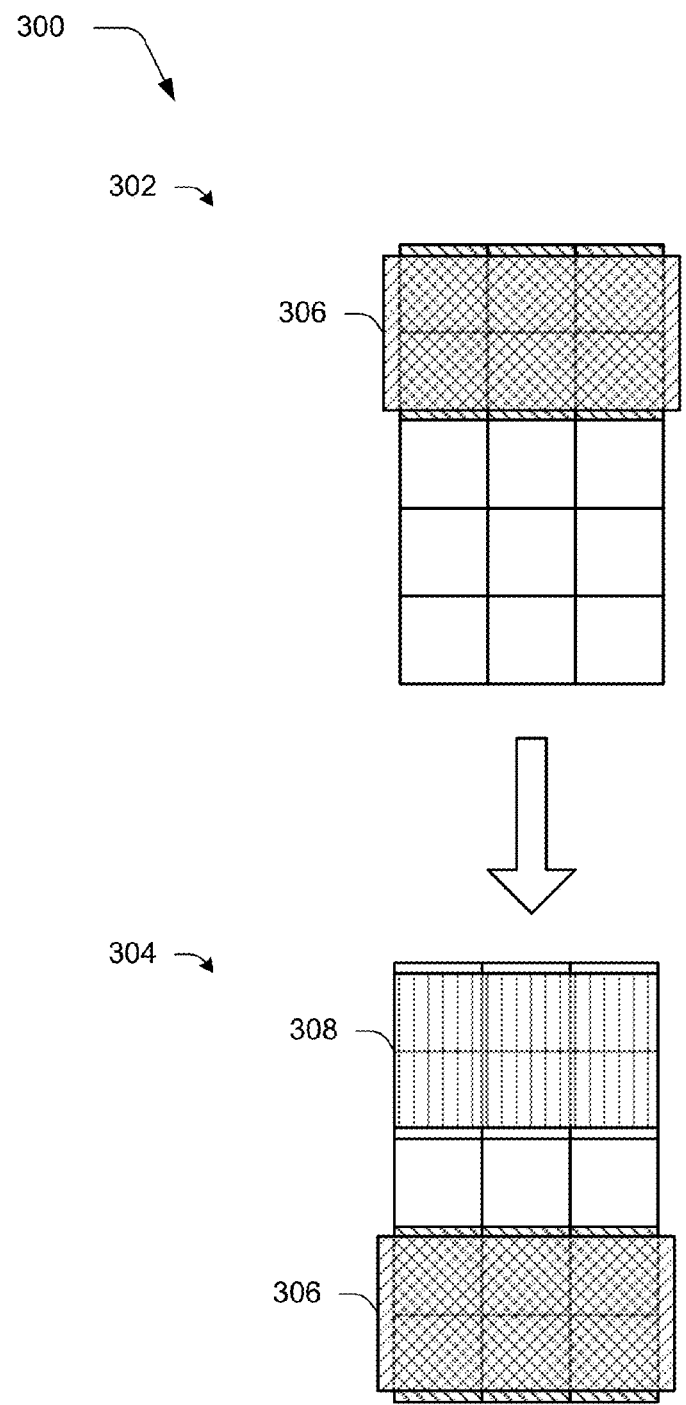
FIG. 3 depicts an example implementation in which interaction between an applications and logical surfaces of a virtual surface is shown.

FIG. 3 depicts an example implementation 300 in which interaction between an applications and logical surfaces of a virtual surface is shown. This example is also illustrated through use of first and second stages 302, 304. In this example, an application's viewport 306 is shown in both the first and second stages 302, 304. Accordingly, at the first stage 302 the application initially renders to the first 6 tiles of the virtual surface (that includes 15 tiles) that are within the viewport 306, which are shown through cross-hatching.

As a page that is represented by the virtual surface is scrolled, the application may now cause the last six tiles to be rendered as shown in the second stage 304. Accordingly, the application 110 may call "trim" to indicate that the region defined by the last six tiles is currently being used and thus the rest of the content is not currently being utilized. The composition system 114 may then choose to recycle the logical surfaces 506 that originally represented the first 6 tiles.

The composition system 114 may also expose APIs 116 of FIG. 1 to create and delete logical (i.e., physical) and virtual surfaces as well as to make updates to the individual surfaces. The composition system 114 may enforce the region to be updated by the application 110 to avoid extraneous visuals when drawing outside of an updatable area.

Initialization and Batching

Figure 4:
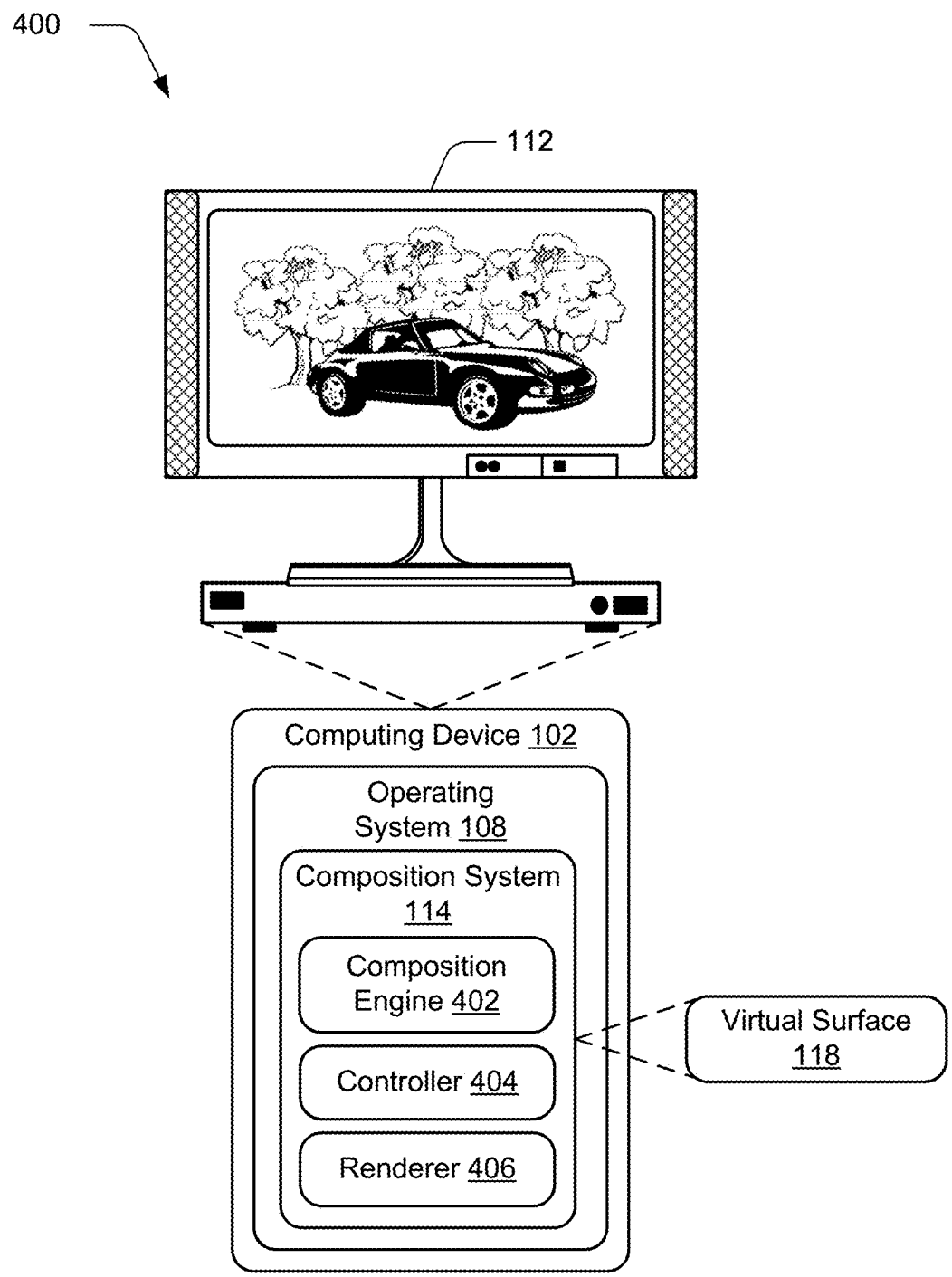
FIG. 4 depicts an example implementation showing a composition system of FIG. 1 in greater detail.

FIG. 4 depicts an example implementation 400 showing the composition system 114 of FIG. 1 in greater detail. In today's world of computing, users frequently find themselves viewing and navigating within large and rich content, an entirety of which is not displayed by a display device at any one time. Examples of this include a complex and dynamic web page, a modern application view with a large list of live items/groups of photos, music or other live content, or a large document.

User interfaces such as touch and image capture based manipulations allow users to scroll, pan, and zoom rapidly across a multitude of displays of user interfaces on slates, phones, large scale TV/projections, and so on. In most cases pre-rendering of the entire content and keeping it up to date as it animates and changes can be prohibitively expensive and indeed may not even be supported by hardware of the device. Instead parts of the content coming into the viewport may be rendered and cached intelligently, e.g. rendered ahead speculatively before user manipulation brings it into the viewport and discarded from cache when the viewport moves away to reduce used resources as described above.

In order to provide desired responsiveness to the user, composition and rendering may be performed separately by the composition system 114. This is illustrated through incorporation of a composition engine 402, controller 404, and renderer 406 by the composition system 114. In one or more implementations, these components of the composition system 114 may be executed asynchronously. In this way, pre-rendered content can be panned/zoomed by a controller 404 that is responsive to user inputs and composition engine 402 while the renderer 406 continues to render.

As previously described, the composition system 114 may employ one or more virtual surfaces 118. Use of a virtual surface 118 allows caching and composition of already rendered content. Renderer 406 updates and trims areas on the virtual surface 118 may be performed based on a speculative rendering policy while the controller 404 and composition engine 402 are used to transform the virtual surface 118. This transformation may be performed based on user input to generate updates to a user interface based on areas of the virtual surface 118 that have rendered content and are in the viewport. The composition engine 402 may be configured to compose multiple virtual surfaces 118 and/or visuals at a time.

In one or more implementations, the composition system 114 may be configured to employ the logical surfaces 120 as fixed or mixed size tiles that are used as front-buffers for composition. When the renderer 406 wants to update a part of the virtual surface 118, the renderer 406 may perform the rendering into a separate update surface or render directly to the tile surfaces. If using a separate update surface, the contents are copied from the update surface to the front buffer tiles when finished drawing. Tiles may then be released when the renderer 406 trims away the valid content from the tiles.

This implementation, however, may result in structural tearing as content that has changed is composed on the screen with out-of-date content. Additionally, seams between tiles or chunks of regions that are updated on the virtual surface may be generated due to gutters and sampling (e.g. bilinear) or T-junctions as well as cause excessive CPU and GPU usage to deal with gutters, multiple overlapping updates, and complex valid regions. Further, excessive memory usage may be encountered due to dynamic content changes or content as manipulated by the user. For fixed/mixed size surface per tile approaches, memory waste may be encountered for larger sized tiles due to unused portions of the tiles, CPU/GPU waste may be encountered due to rendering/processing updates for smaller tiles and rendering them at composition time, and CPU/GPU copy costs may be encountered from update buffers to front buffers if separate update buffers are used. Therefore, a balancing may be performed between a variety of considerations in implementation of the composition system 114.

These considerations may include the following set of tenets for the user experience quality and performance when manipulating rich and/or dynamic content that does not fit into the viewport. A first such tenet is referred to as visual responsiveness. This means that the virtual surface 118 may be configured to feel like a real surface at the "fingertips" of the user and user manipulation. This may be supported through configuration of the composition system 114 to respond to and track manipulations without perceived lag. Separation of renderer 406 from the controller 404 and composition engine 402 may be used to support this tenet in a robust manner.

A second such tenet involves visual coherence. In this example, as the surface is manipulated and dynamic content (e.g. animations) in it is updated, the content on the display device 112 does not show artifacts that interfere with the user's immersion or confidence. For example, the content may be displayed without seams, visible tearing or corruption, parts of the user interface do not lag behind other parts to which they are to be attached, and so forth.

A third one of the tenets involves visual completeness. If a user interface is visually complete, a user rarely sees a filler/placeholder pattern (e.g., a checkerboard) covering parts of the display device 112 and if so this display is limited to relatively short durations. Additionally, surface content updates do not visibly lag, however this may not be guaranteed, e.g., for open-ended rich content on low powered devices across zoom levels. For example, the more optimal and efficient it is for the renderer 406 to update the virtual surface 118 and the composition engine 402 to compose it, the more bandwidth the renderer 406 has to further render ahead speculatively to achieve additional visual completeness.

A fourth tenet involves live surfaces. For this tenet, animations, videos, and other dynamic content continue to play and execute during manipulations without stutter. This may be realized if the renderer 406 achieves visual completeness and has bandwidth to implement the live surfaces. This may be supported by efficient updating and composing of the virtual surfaces 118.

The composition system 114 may be configured to balance these tenets. In this way, a comprehensive solution may be implemented that supports visual correctness and coherence as well as responsiveness for managing and composing virtual surface updates such that the renderer 406 has sufficient bandwidth to ensure visual completeness and live surfaces.

Figure 5:
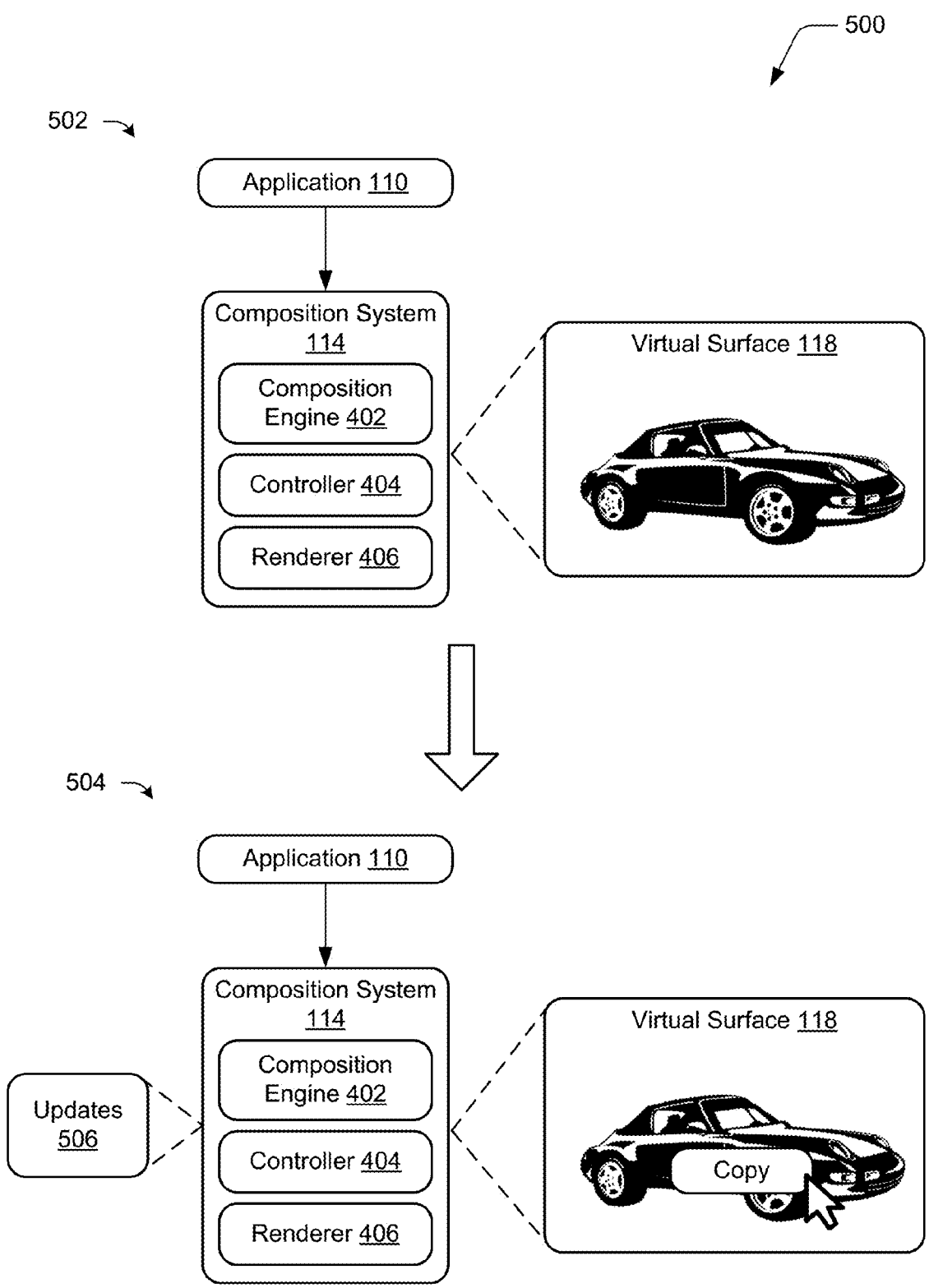
FIG. 5 illustrates an example implementation of operation of the composition system to initiate a virtual surface.

FIG. 5 illustrates an example implementation 500 of operation of the composition system 114 to initiate a virtual surface 118. This implementation is illustrated through the use of first and second stages 502, 504. At the first stage 502, an application 110 requests a size of a surface in which to render a user interface, which may be associated with one or more visuals. As previously described, a virtual surface 118 is first initialized (e.g., created) such that it is not backed by actual allocations, and thus does not "hold bits" upon initialization.

The application 110 may then specify visuals to be rendered to the virtual surface 118. Accordingly the composition engine 402 may compose these visuals for rendering by the renderer 406 to the virtual surface 118, such as a car as illustrated. This may be performed through the use of tiles or "chunks" in which a size of the allocation is specified by the application.

At the second stage 504, the renderer 406 may receive instructions to update an area of the virtual surface 118, such as a rectangular area of the surface. The interface between the renderer 406 and the composition engine 402 is such that the renderer 406 may implement a plurality of updates 506 (e.g., which may include trim instructions, changes to visuals, creations or removal of visuals, and so on) across a multitude of virtual surfaces 118, as well as transform updates on visuals that may have these surfaces as content. Examples of the updates 506 include a visual configured as a cursor and a visual configured as a user-selectable button.

In an implementation, a "commit" operation may be called such that the plurality of updates 506 may be rendered by the renderer 406, e.g., updated as a batch. In this way, the composition system 114 may protect against rendering of incomplete updates. This allows the renderer 406 to have coherent and consistent visuals displayed by the display device 112 per the visual coherence tenet.

Additionally, the controller 404 that processes user input may update transforms (e.g., for panning or zooming) on the visuals directly on the composition engine 402 based on user manipulations without going through the renderer 406. This aspect provides visual responsiveness even if the renderer 406 is occupied for a relatively long period of time, e.g., to process animations or other state changes for dynamic content and or rasterizing complex content on thin devices having limited processing resources.

Implementation of the virtual surface 118 may involve providing the renderer 406 with a surface and offsets into which the renderer 406 can render. This surface may then be "flipped" in by the composition engine 402 when the composition engine 402 has picked up and is processing the entire batch of updates that have been committed to the renderer 406. This may be used to eliminate a copy operation that would otherwise be performed if a separate update surface was used for rendering of the update by the renderer 406.

The flipping also allows the composition engine 402 ensure that each of the updates 506 generated by the renderer 406 in a single batch (e.g., via the commit operation) make it to the display device 112 as a whole. Thus, processing of partial updates may be avoided by the composition system 114.

Updates and Lookaside List

Figure 6:
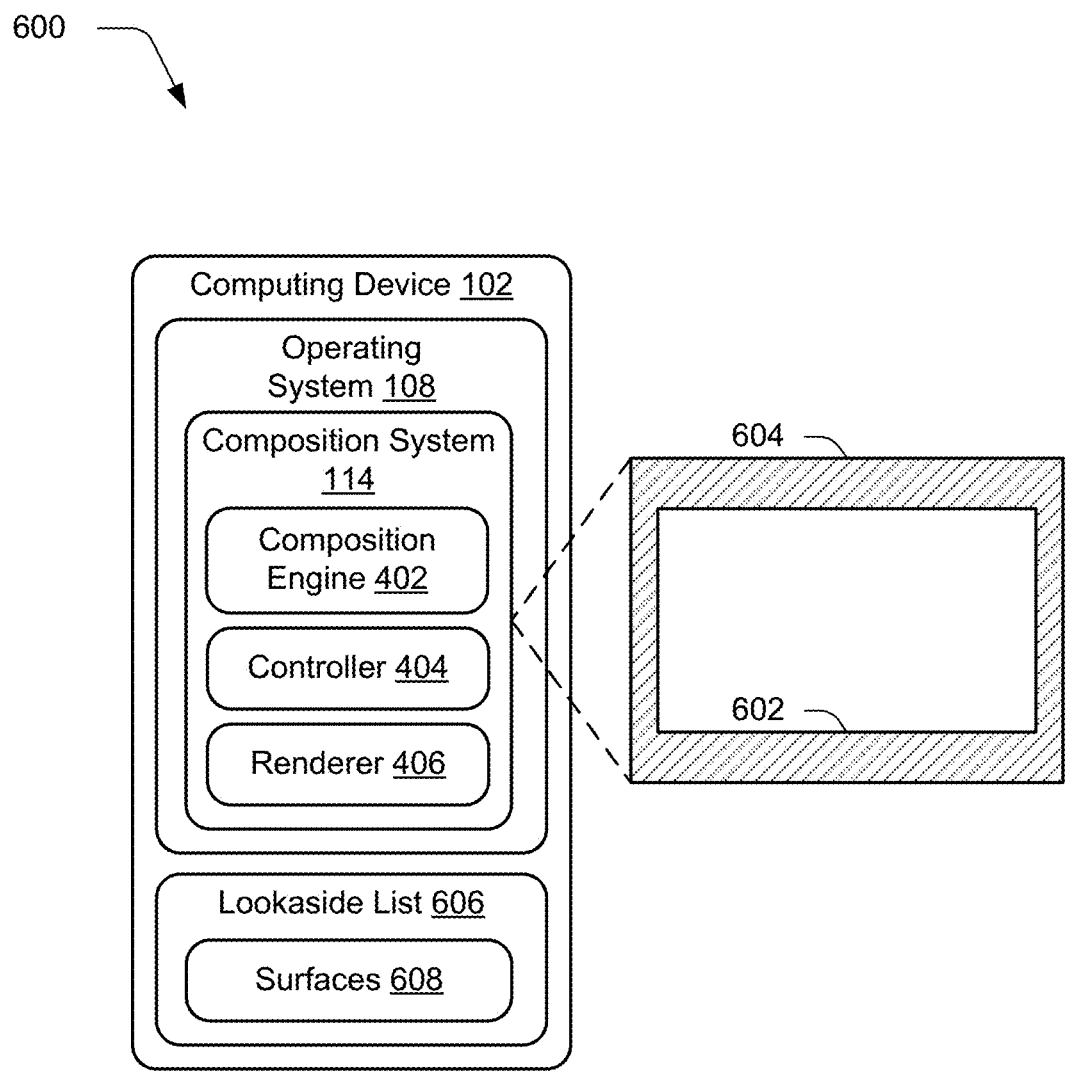
FIG. 6 depicts an example implementation showing preparation of a surface by the composition system for an update.

FIG. 6 depicts an example implementation 600 showing preparation of a surface by the composition system 114 for an update. The composition system 114 may utilized a variety of different techniques to prepare a surface for an update. In a first case, the composition system 114 may receive a request to allocate an area to perform an update from an application, which is illustrated as a first rectangle 602 in the illustrated example.

Responsive to this request, the composition system 114 may allocate an area that is larger than the requested area, which is shown as a second rectangle 604 that includes the requested first rectangle 602. Therefore, if updates of slightly different sizes are received subsequently, this allows reuse of previously allocated surfaces.

The composition system 114, for instance, may maintain a lookaside list 606 of surfaces 608 that were previously allocated by the composition system 114. This may be used by the composition system 114 to "hoard" memory 106 for reuse of the surfaces 608 and "chunks" of the surfaces 608.

These surfaces 608, for instance, may be maintained in memory 106 of the computing device 102 for surfaces that are no longer in use. Therefore, upon receipt of a request by the composition system 114 to provide a surface for an update, the composition system 114 may first examine the lookaside list 606 to determine if any previously allocated surfaces 608 are available in memory 106 of the computing device 102 that correspond to the request. If so, the composition system 114 may leverage these surfaces thereby improving overall efficiency of the system by not allocating a new surface. Additionally, through allocating a larger size to the surfaces (e.g., having more pixels) than requested as previously described, a likelihood that these surfaces 608 are relevant to a subsequent update may be increased.

For example, if updates of slightly differing sizes are received over a period of time, this allows more reuse of previously allocated surfaces 608, e.g. if the next update is for an area that is a couple pixels wider or taller. Thus, instead of allocating a new surface, the composition system 114 may leverage the lookaside list 606 of previously made available surfaces to locate a relevant surface. It should be noted that trims and other updates of parts of a surface may also be available.

This may be tracked through regions based on confirmed batches. If the update fits into an available part of an existing surface 608 that also has other valid content, that surface may be reused. This also reduces costs on the composition side by avoiding rendering from multiple different surfaces as each such transition incurs setup costs. A size of the lookaside list 606 (e.g., a number of surfaces 608 maintained in the list and in memory of the computing device 102) may be set based on historic peak use or a variety of other factors.

Figure 7:
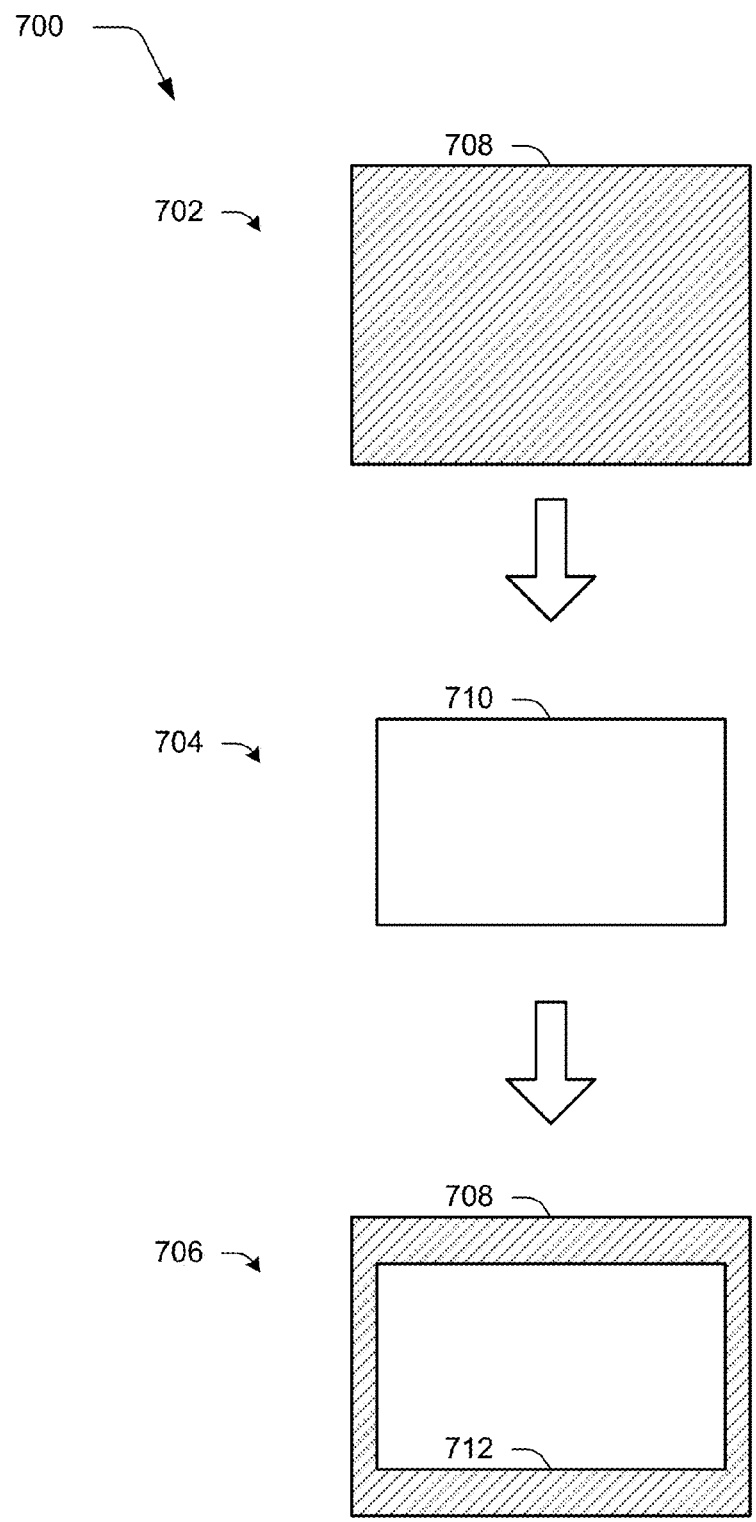
FIG. 7 depicts an example implementation of operation of the composition system using a lookaside list of FIG. 6.

FIG. 7 depicts an example implementation 700 of operation of the composition system 114 using a lookaside list 606 of FIG. 6. This implementation is shown using first, second, and third stages 702, 704, 706. At the first stage 702, a surface 708 is allocated for rendering by the renderer 406. The renderer 406 may then be given control of the surface 708 to perform the rendering.

During this rendering, another surface 710 may be allocated at the second stage 704 for performing an update. In this example, the other surface 710 is included within a same area of the display as the surface 708 being rendered by the renderer 406. Thus, the surface 710 may be allocated and filled (e.g., drawn to) while the surface 708 is being rendered. This surface 710 may then be passed to the renderer 406 for rendering, e.g., responsive to a commit command as previously described.

At the third stage 706, another update may be received for updating a user interface. In this example, the composition system 114 determines that the update involves a previously allocated surface through use of the lookaside list 606 of FIG. 6, e.g., surface 708 from the first stage 702. Accordingly, the composition system 114 may use the surface 708 that was already allocated to include an update 712. In this way, the surface 708 may be used without reallocating a new surface, thereby saving resources of the computing device 102. A variety of other examples are also contemplated.

Gutters

Figure 8:
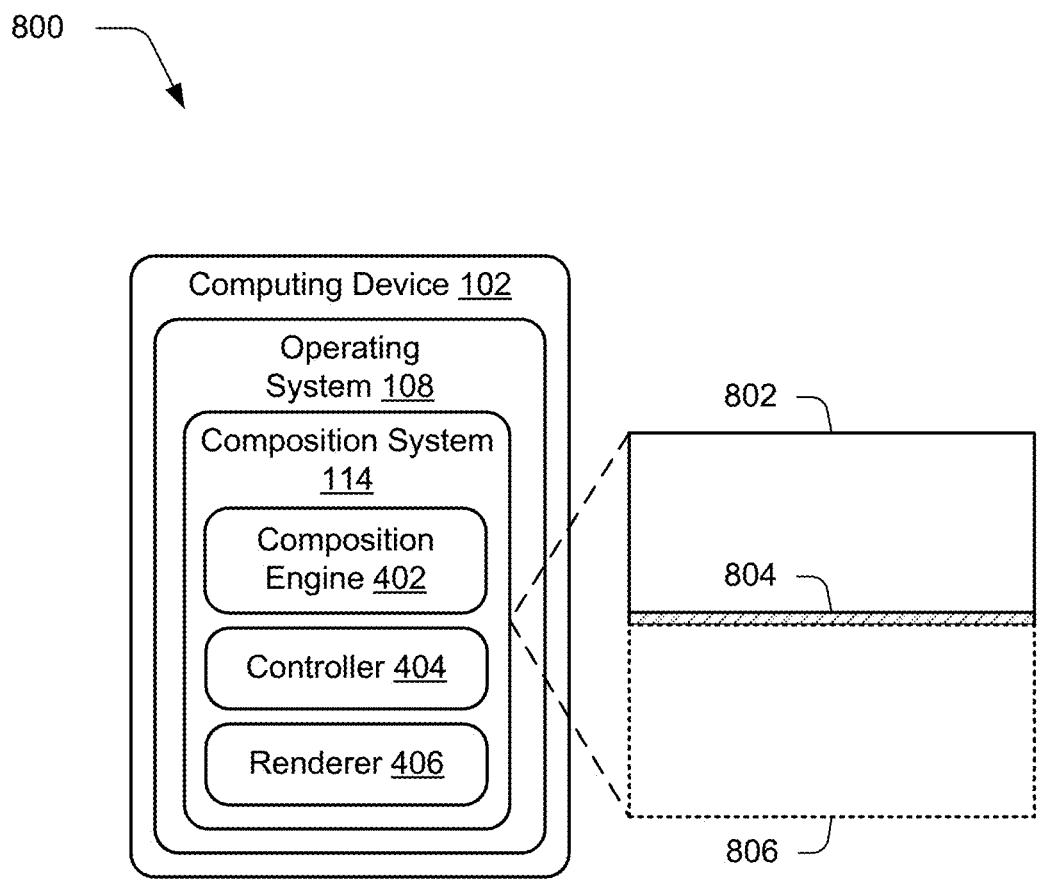
FIG. 8 depicts an example implementation showing operation of the composition system to employ gutters.

FIG. 8 depicts an example implementation 800 showing operation of the composition system 114 to employ gutters. One issue in maintaining visual correctness involves missing gutters. For example, a virtual surface may be positioned or scaled to sub-pixel offsets, such as due to scrolling and so on. Accordingly, values for pixels to be displayed by the display device 112 are determined based on neighboring pixels, such as to utilize bilinear sampling.

However, neighboring pixels of an update 802 positioned on an edge 804 of the update 802 may have values based on erroneous information. For example, if neighboring pixels outside the update 802 contain "trash" (e.g., from other updates), a rasterizer may sample from these pixels and thereby produce pixels with bad values, which may look like seams when displayed by the display device 112.

One way to deal with this is to copy the row or column of pixels at the edges that may be in another tile/clump surface 806 over to neighboring pixels in the newly allocated surface of the update 802. However, these additional copies can prove prohibitively expensive for processing resources of the computing device, e.g., both for CPU and GPU resources of the computing device 102.

Accordingly, in one or more implementations edges of an update 802 are aligned with surface edges. A clamping operation is then utilized which causes a rasterizer to use a value of the pixel at surface edge when sampling the "neighboring" pixels which would fall outside the surface. This may be used to produce a reasonable trade-off between cost and visual correctness, even though a result may not be completely visually correct the result may appear reasonably correct to a user. In one or more implementations, the gutter itself is not updated.

In some instances, the update edge may not be able to be aligned with a surface edge. This may be due to allocation of a surface that is larger than an update. In such instances, the row/column of pixels at the edge of the update on the same surface may be copied to the neighboring pixels for a similar effect to the clamping behavior.

Similarly, when trimmed and updated, the gutters are not updated with the potentially new pixels that may be drawn in one or more implementations because they contain previously valid pixels that were displayed together with the currently valid pixels. This supports a tradeoff between correctness and performance that yields minimal visual artifacts in the general case that are disturbing to a user when viewed.

Blending and BLT

Figure 9:
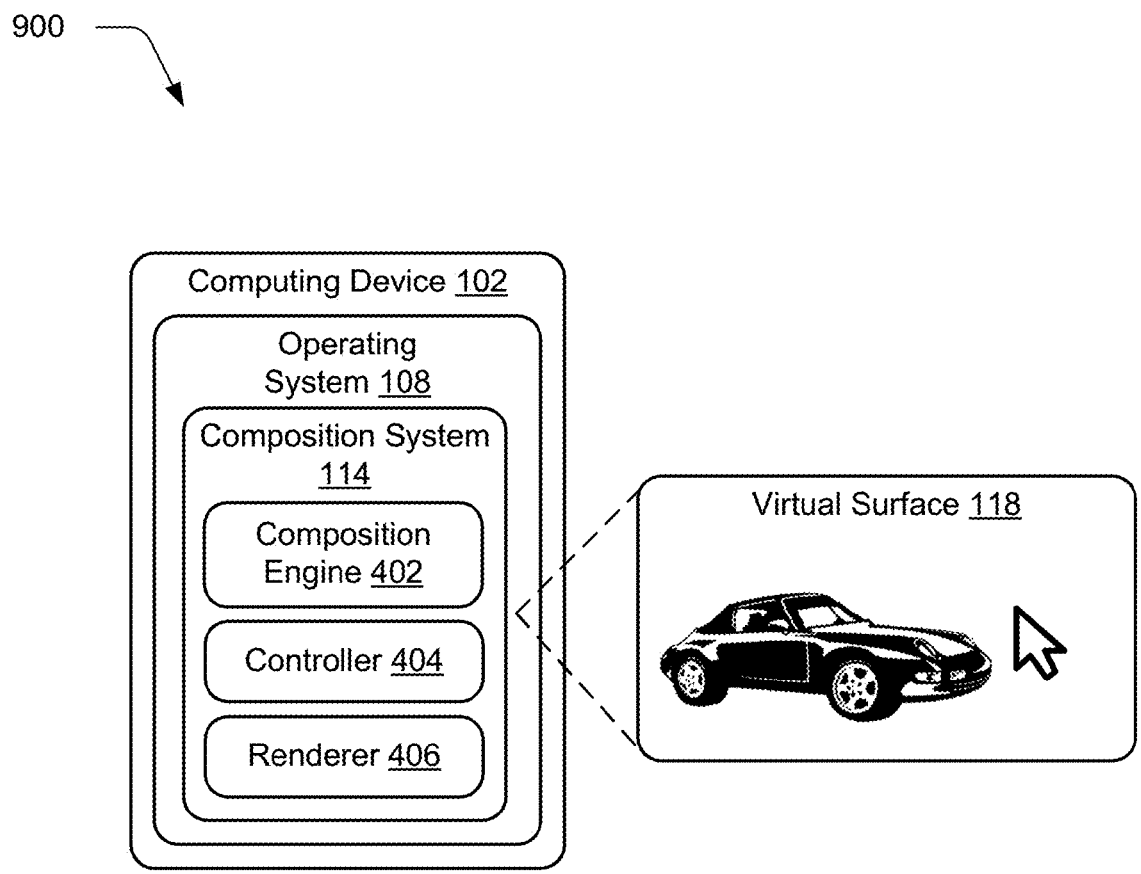
FIG. 9 depicts an example implementation showing management of valid regions by the composition system.

FIG. 9 depicts an example implementation 900 showing management of valid regions by the composition system 114. As previously described, a virtual surface 118 may contain portions that are valid and not valid for an update. For the illustrated example of a virtual surface 118, for instance, an update may involve a cursor in the virtual surface 118 but not the car. Therefore, the cursor may be used to define a region of the virtual surface 118 that is valid as opposed to other regions of the virtual surface 118. By tracking these regions both for that virtual surface 118 as well as other surfaces, the composition system 114 may avail itself of a variety of optimizations.

For example, a technique is described to divide regions that are to be rendered from a surface into two parts, blended and BLT'd. This technique may be used to address instances in which updates are small and the resulting valid region on the virtual surface are relatively complex, e.g., result in complicated meshes having numerous small source surfaces.

If the surface is "premultiplied" or transparent (and not "opaque" or set to ignore alpha values), then the surface is "blended". This may be used to blend larger rectangular shapes with "cleared" and/or fully-transparent pixels where there is no content provided by the renderer. In some cases this becomes more optimal than processing and rasterizing with a complex mesh that outlines each of the paths/edges of a complex shape.

This approach may also be used for gutters when the valid region is complex for an opaque surface. For example, internal parts may be BLT'd but pixels around the edges are blended such that neighboring pixels are cleared. Therefore, accurate values may be achieved when the rasterizer samples from these pixels. In one or more implementations, this technique is used for edges of the virtual surface 118 and is not used for internal edges between tile clumps and surfaces making up the virtual surface.

Bits may be copied and parts cleared in order to ensure clump surfaces are allocated that are aligned to a tile size and content from previous surfaces that owned that tile is moved into the new surface. In one or more implementations, this is not performed for parts that are to be updated by the renderer 406, e.g., an update rectangle in the middle as shown in FIG. 7. If the surface is opaque, after the update, the pixels on the edges may be made opaque by "blending", i.e. to arrive at full opacity in the alpha channel of those pixels.

Each of the tasks of copying, clearing and making opaque may be performed using "regions" that are made up of non-overlapping rectangular stripes. Regions may be intersected, form a union, or subtracted. Further, the non-overlapping rectangular stripes that compose the region be enumerated. This allows efficient merging of various rectangles and regions into a single region and extracting the optimal set of resulting rectangles. For instance, Win32 HRGN is a GDI construct that may be employed to leverage these facilities. These operations are used to identify merged and optimized sets of rectangles on which an operation is to be performed, e.g., clearing or copying, instead of determining what to do per each tile individually. This may be used to achieve significant efficiency in both CPU and GPU for performing these tasks, and also allows a reduction in tile/alignment size to relatively small values, such as 32×32 or 16×16, thus reducing waste as previously described.

Trim requests from the renderer 406 may be dealt with differently based on complexity of a valid region. In a typical case, the valid region of a tile clump/surface may be updated according to the trim request. However, if the valid region is complex and the BLT/blend technique is being utilized, additional operations may be performed. For example, parts of the valid region may be blended to be turned opaque because these parts are now located at an edge of the region. Another way to deal with this is to create new clumps for the tiles from which valid parts are removed. The tiles, however, may continue to have some valid parts remaining. For these tiles, remaining valid parts may be copied from existing surface, turned opaque and trimmed away parts may be cleared. These new clumps may be committed when the renderer 406 commits the entire batch of updates, e.g., due to a commit operation. This operation may be optimized using regions of rectangular stripes, although other examples are also contemplated.

When committing a set of updates by the renderer 406, trims and visual transforms (e.g., resulting set of tile clumps/surfaces and their valid regions) may be communicated to the composition engine 402. The updates may be communicated with respective tokens that may be used by the composition engine 402 to ensure any outstanding CPU/GPU work for rasterization on these surfaces is complete. At this time, additional techniques may be utilized to further improve efficiency, examples of which are described in the following sections.

Push Down

Figure 10:
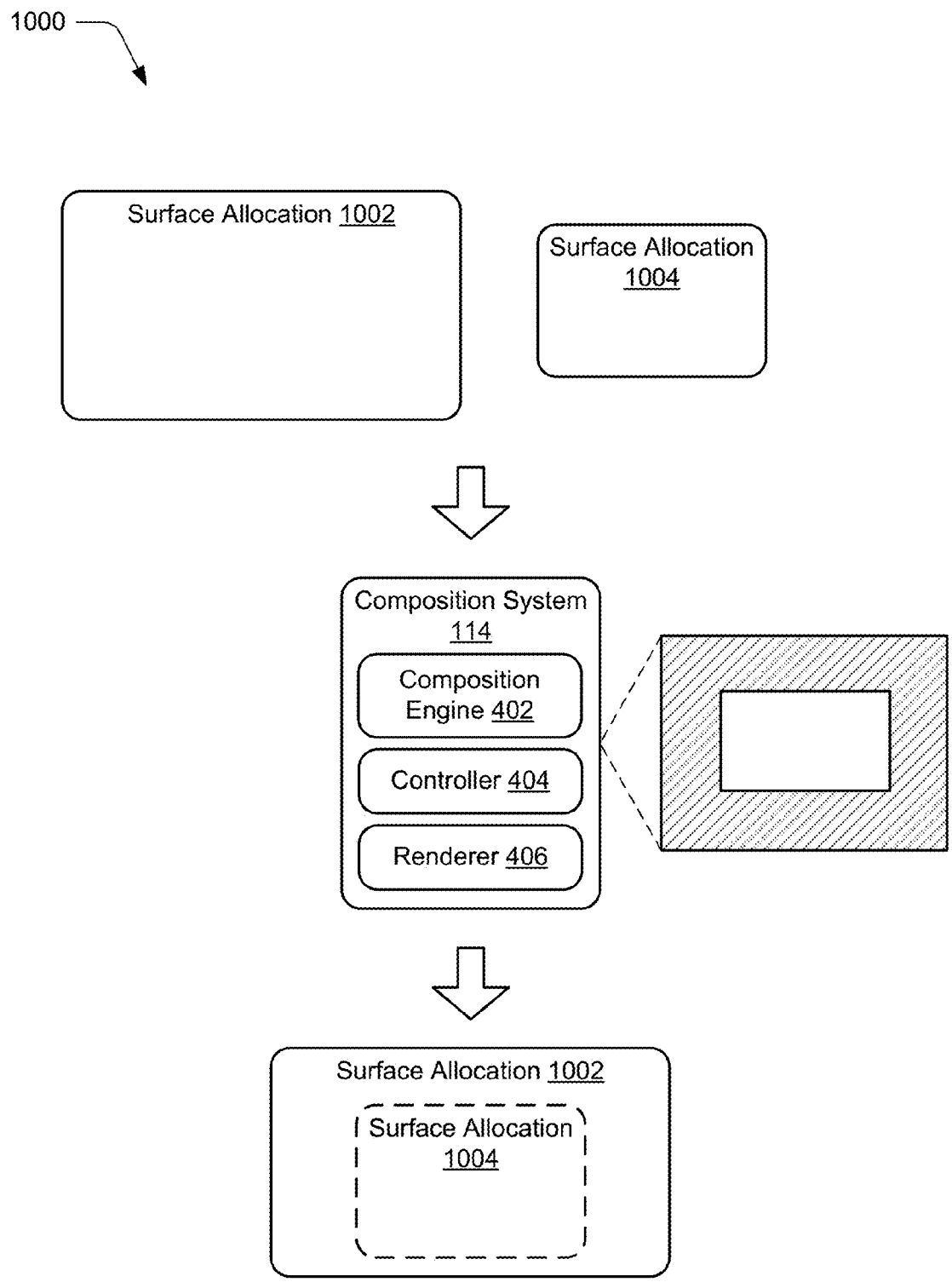
FIG. 10 depicts an example implementation showing operation of the composition system to combine surfaces using a push down technique.

FIG. 10 depicts an example implementation 1000 showing operation of the composition system 114 to combine surfaces using a push down technique. In this example, the composition system 114 has made a surface allocation 1002 to display a visual, which is shown as a box using hash marks in the figure. Another surface allocation 1004 is then made to perform an update, which is shown as a white box positioned with the hash-marked box.

By tracking valid regions of the surfaces by the composition system 114, allocations may be combined to improve resource utilization. For example, rendering from multiple surfaces may be more resource intensive than rendering from a single surface.

In the illustrated example, valid portions of the surface allocation 1004 are "pushed down" into the surface allocation 1002. This is illustrated using a dashed box to indicate that valid regions from the surface allocation 1004 are now included in surface allocation 1002. After the push down, the surface allocation 1004 that included the update may be released, thereby freeing portions of the memory 106 of the computing device 102. Thus, this technique may be used to combine surfaces without creating a new surface allocation by leveraging an allocation of one of the surfaces that was combined.

For example, in some instances the composition system 114 may be confronted with overlapping large updates in a current or previous batch of updates. This may cause allocation of a plurality of surfaces that include relatively small valid regions. Consequently, the composition system 114 may have allocated large surfaces, but the relatively small valid regions may prevent these surfaces from being released.

However, by "pushing down" valid regions from a first surface (e.g., a newer smaller surface) to a second surface (e.g., an older larger surface), valid regions from the first surface may be removed. This permits release of the first surface, thereby freeing memory and reducing an amount of surface allocations that are managed by the composition system 114 without involving additional surface allocations. In this way, the renderer 406 may be tasked with rendering fewer surfaces, thereby improving efficiency of the composition system 114. Other techniques are also contemplated in which a new surface allocation is made, an example of which is described in the following section.

Enumeration and Clumping

Figure 11:
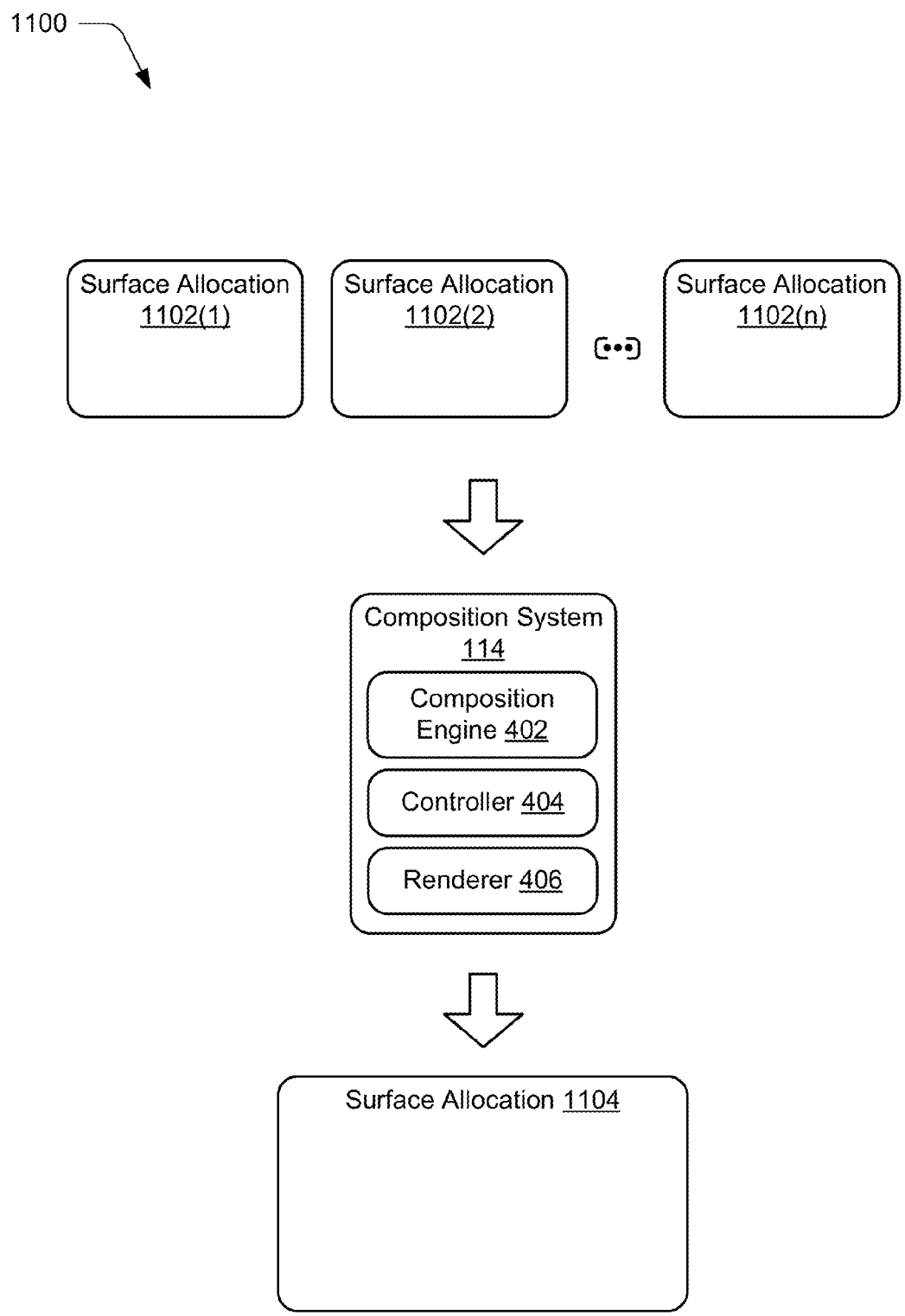
FIG. 11 depicts an example implementation showing operation of the composition system to combine valid regions into a new surface.

FIG. 11 depicts an example implementation 1100 showing operation of the composition system 114 to combine valid regions into a new surface. As previously described, the composition system 114 may be configured to track valid regions of surface allocations, examples of which are illustrated as 1102(1), 1102(2), and 1102(n) that have respective valid regions. Over time, a size of a valid region relative to a surface that includes the region may decrease, such as due to updates from other surfaces and so on. Accordingly, the composition system 114 may be configured combine valid regions from the surface allocations 1102(1)-1102(n) into one or more new surface allocations 1104.

The composition system 114, for instance, may be configured to address surface allocations and composition by reducing a number of surfaces that are setup as sources and rendered from for composing a display on the display device 112. This may be performed by enumerating an optimized set of rectangles in an overall virtual surface valid region. A clump may then be created for each such rectangle. If this results in a large number of smaller rectangles, the blend/BLT technique discussed above may be used. In this way, larger rectangles may be achieved with areas of pixels that have been cleared that are to be appropriately composed by the composition engine 402.

When the composition engine 402 receives an update batch, for instance, the engine may first determine the "dirtied" parts of virtual surfaces and visuals that make up a display tree that are to be updated. This may be performed to include explicitly calculating and communicating dirty regions from updates and trimming to the compositor, e.g., even though the underlying surfaces or "clumps" may change (e.g., push-down or re-clumping), valid regions of same content may have carried over, so no new dirty regions may have been generated. These rectangles describing the valid regions may be explicitly communicated per update/trim operation. In one or more implementations, the dirty region may be reduced to result in a fewer number of larger rectangles to avoid incurring a large overhead in setting up and executing a number of smaller render operations. One technique for doing this is to allow a maximum number of dirty rectangles. As new dirty rectangles are encountered, these rectangle may be added to the list or merged (e.g., form a union) with the rectangle that results in the smallest area increase overall.

Mesh

Figure 12:
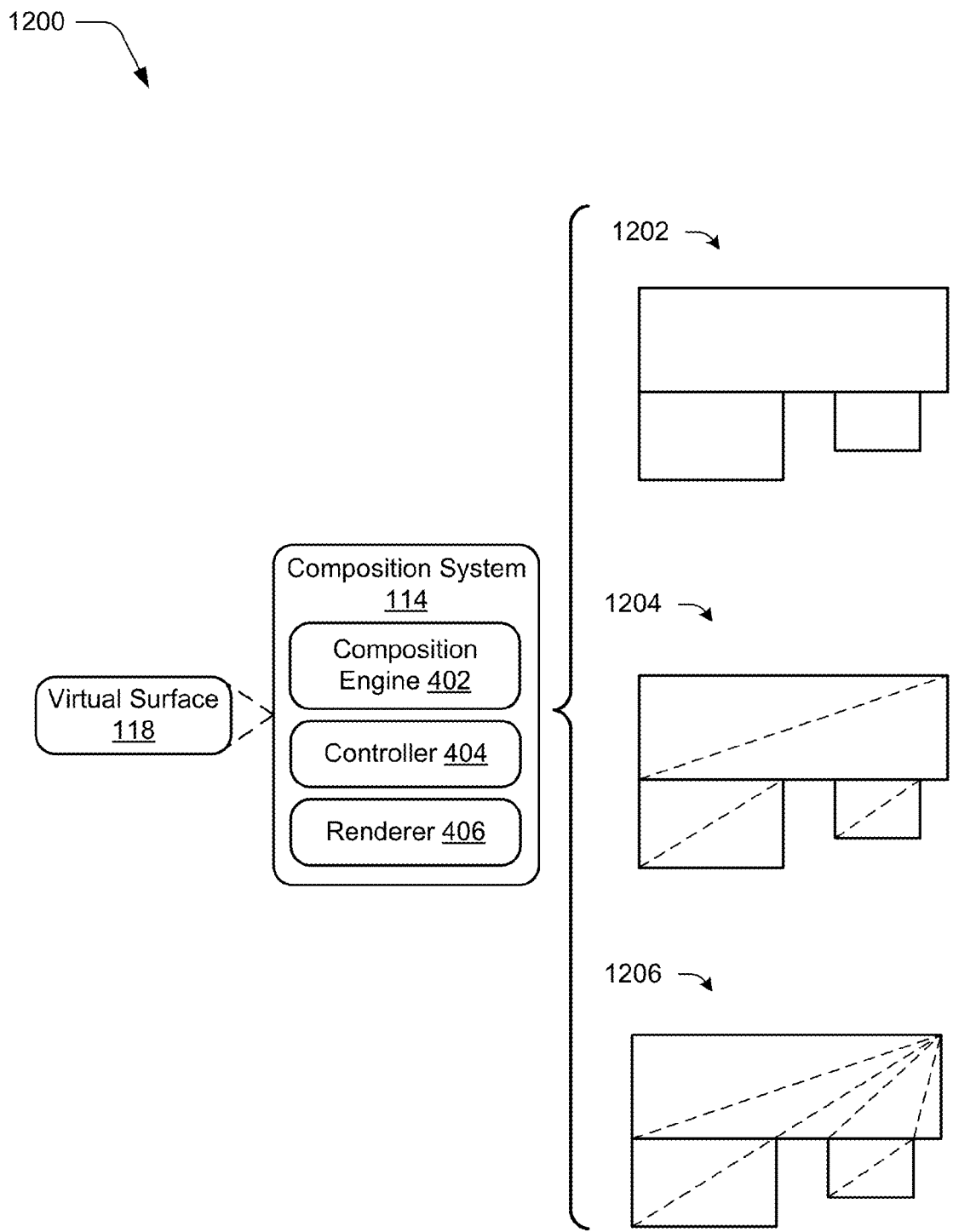
FIG. 12 depicts an example implementation showing operation of the composition system to employ a mesh.

FIG. 12 depicts an example implementation 1200 showing operation of the composition system 114 to employ a mesh. The mesh (e.g., a list of points) may include a plurality of visuals for which a single draw call may be made to a driver of a GPU. In this way, a number of draw calls made to the driver may be reduced, thereby avoiding overhead involved with each call.

The composition engine 402 has a number of options to compose the clumps/surfaces of a virtual surface 118. For example, since the composition engine 402 is aware of valid regions of each clump, the composition engine 402 may start by skipping those clumps that do not overlap with a dirty region that is to be updated. If the visual contained in the virtual surface 118 is pixel aligned a translation transform without utilizing the gutter techniques described above. This allows use of a simple BLT/Blend for each rectangle in the clumps.

Instead of performing these operations one at a time, the composition engine 402 may create a triangle mesh out of the set of rectangles and cause the surface to be rendered using that mesh. For example, a set of rectangles 1202 that have valid regions may be examined by the composition system 114. A triangle mesh 1204 may then be generated for the set of rectangles by splitting each rectangle into two triangles. However, T-junctions may be formed from the rectangles. T-junctions may cause the triangle mesh 1204 to be rasterized with seams, e.g., due to floating point or rounding error. Accordingly, the composition system 114 may instead process the set of rectangles to form a triangle mesh 1206 of non-overlapping rectangles that does not include T-junctions.

The generated mesh may be cached across composition frames and reused if the rectangles of the clump do not change. If there is a non-pixel aligned transform, but the transform solely includes translation, the composition engine 402 can still generate meshes for and render each clump on its own. However, if there is a more complex transform, the composition engine 402 may process the set of rectangles to avoid T-junctions to ensure correct rasterization without seams.

In order to do this, each clump may register a respective set of rectangles with a mesh generator object managed by the composition system 114. As each coordinate is examined, mesh generator functionality of the composition system 114 may add one or more additional vertices on edges that have already been registered. Each registering edge may also have existing vertices in that range added to itself. The result is a set of rectangles for each clump that have additional vertices. These rectangles may then be broken down into a set of non-overlapping triangles using these vertices. Thus, in the case of a non-simple transform, the clumps may be rendered using these generated T-junction free meshes as shown in triangle mesh 1206.

Occlusion

Figure 13:
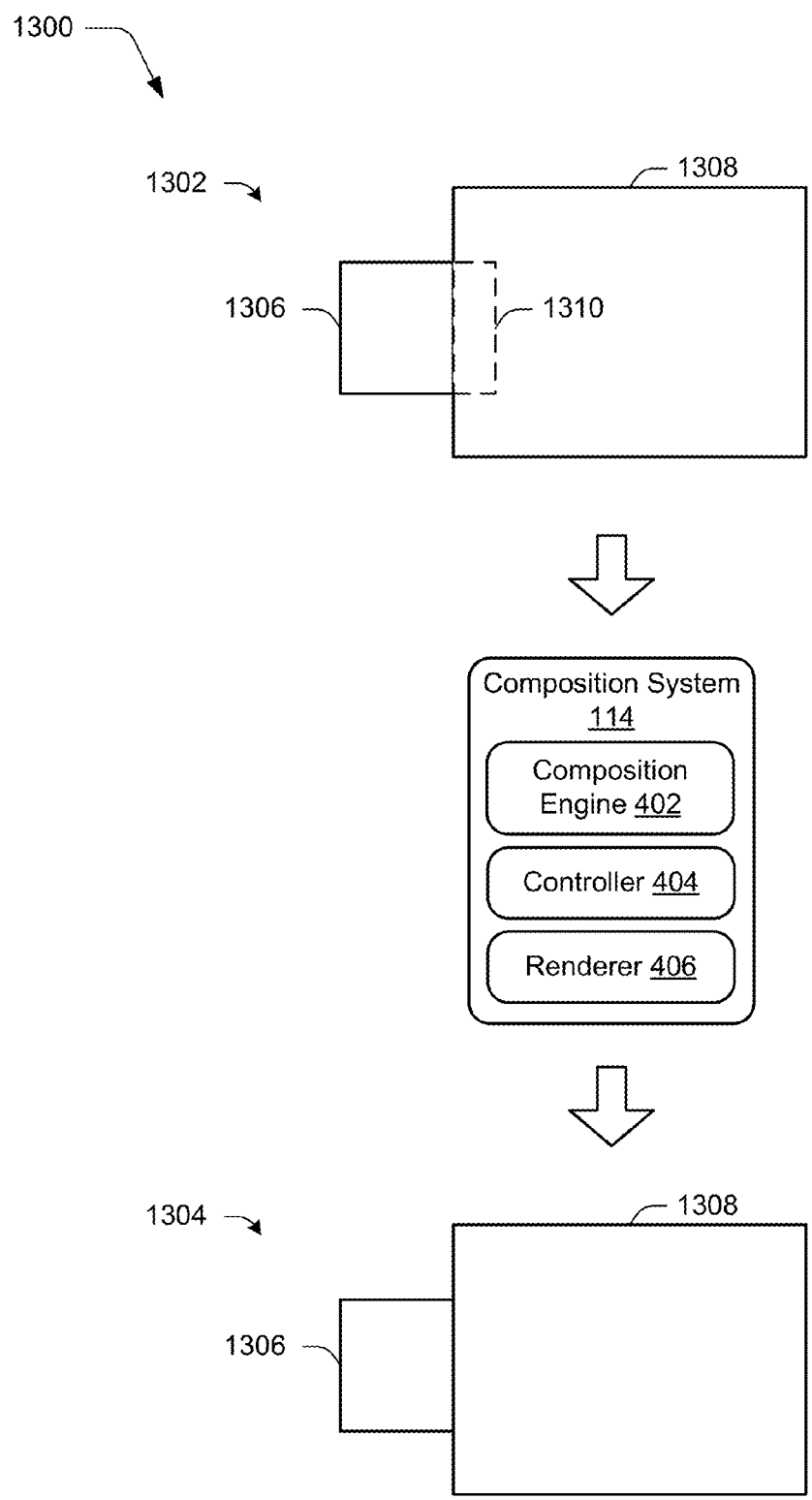
FIG. 13 depicts an example implementation showing operation of the composition system regarding occlusion.

FIG. 13 depicts an example implementation 1300 showing operation of the composition system 114 regarding occlusion. Even though each clump may have instructions to blend parts of its surface and BLT other parts, for opaque virtual surfaces, the composition system 114 is aware of valid and opaque region on each clump.

For occlusion, these regions may be accumulated across the entire virtual surface and used for occlusion detection by the composition engine 402. In one or more implementations, the composition engine 402 may enumerate through the registered occlusion rectangles to identify the parts that are occluded by opaque visuals closer to the user in a z-order for display by the display device 112.

However, breaking down rectangles to complex shapes through the occlusion pass may be expensive. In order ensure that non-overlapping rectangular stripes that make up a region fully occlude a rectangle that would be occluded by the entire region, the composition system 114 may utilize rectangular containment and intersection techniques.

An example of such a technique is shown in the example implementation 1300 of FIG. 13, which is shown through first and second stages 1302, 1304. At the first stage 1302, first and second rectangles 1306, 1308 are to be composed by the composition engine 402. However, the composition engine 402 may determine that a portion 1310 of the first rectangle 1306 is occluded by the second rectangle 1308.

Accordingly, the composition engine 402 may be configured to reduce the checked rectangle if the occluding rectangle obscures an entire edge such that the result is still a single rectangle that has been reduced. An example of this is shown in the second stage 1306 in which the first rectangle 1306 is reduced such that it does not include the portion 1310 that is occluded by the second rectangle 1308. Thus, the edge of the second rectangle 1308 may be used to define a new edge for the first rectangle 1306, thereby conserving resources of the computing device 102. A variety of other examples are also contemplated.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems and example implementations of FIGS. 2-13.

FIG. 14 depicts a procedure 1400 in an example implementation in which a size is allocated for a surface in which to render data. A request is received by a composition system to allocate a surface in which to render one or more visuals, the request specifying a size of the surface (block 1402). The request, for instance, may originate from an application to begin "rendering bits." In one or more implementations, the surface may have already been initialized when the request but received but not allocated such that the surface did not "hold bits" when the request was received.

Responsive to receipt of the request, the surface is allocated by the composition system to have a size that is greater than the size requested to render the one or more visuals (block 1404). As previously described, the composition system 114 may be configured to "hoard memory" to promote reuse of allocated surfaces that are no longer valid. By making the surfaces larger than requested by the application, the composition system 114 may increase a likelihood that the surface will be of use again later.

FIG. 15 depicts a procedure 1500 in an example implementation in which valid regions are tracked by the composition system. Surfaces are managed, by a composition system, that include visuals for display by a display device (block 1502). The surfaces, for instance, may be configured as virtual surfaces as previously described.

Valid regions are tracked within the surfaces that are to be displayed by the display device (block 1504). The surfaces, for instances, may initially be configured to update a portion of a display. Over time, however, other surfaces may updates parts of that display further that were already updated. Accordingly, parts of the surface may remain valid for display while other parts are not valid. The composition system 114 may be configured to track this validity, which may be used to support a variety of different functionality, such as occlusion management, surface resizing, surface compaction, and so on as further described elsewhere in the discussion.

Figure 16:
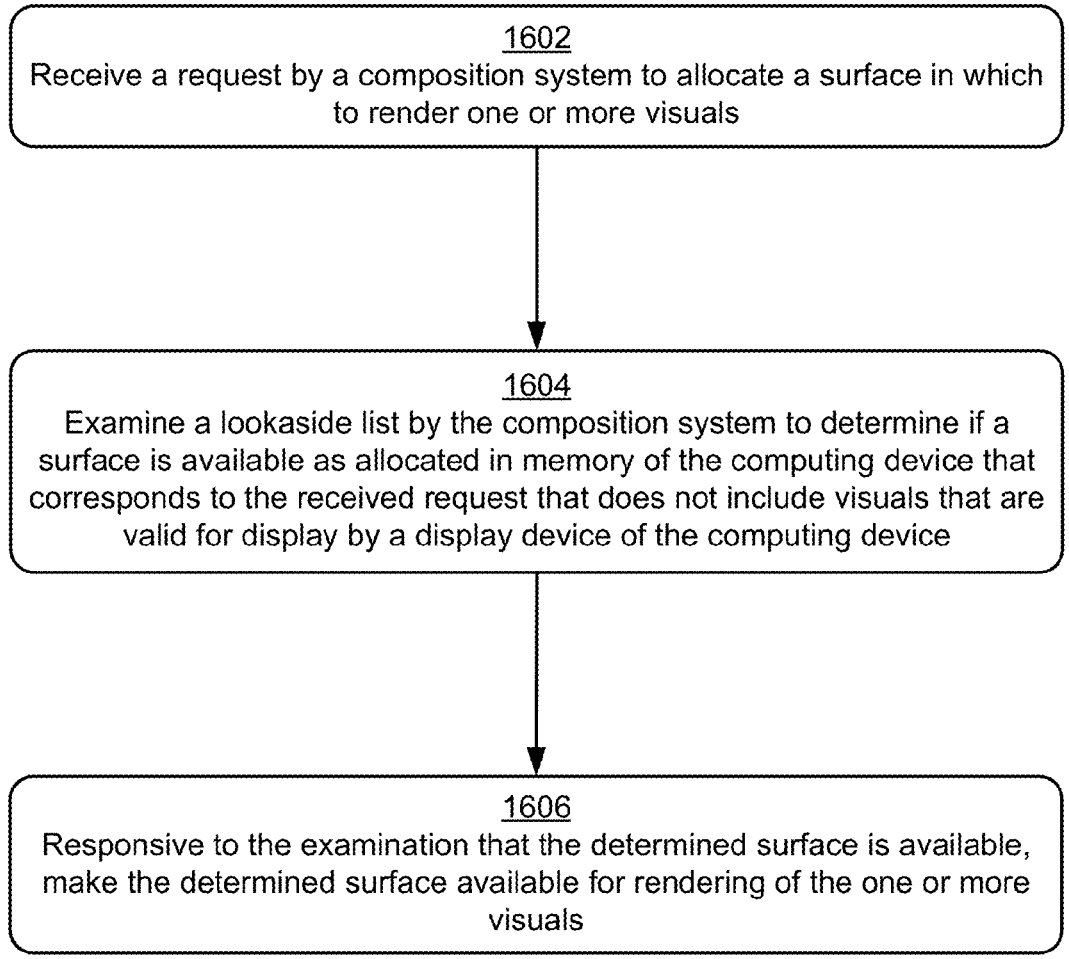
FIG. 16 is a flow diagram depicting a procedure in an example implementation in which a lookaside list is employed to manage surfaces.

FIG. 16 depicts a procedure 1600 in an example implementation in which a lookaside list is employed to manage surfaces. A request is received by a composition system to allocate a surface in which to render one or more visuals (block 1602). As before, the application 110 may make the request as a call through one or more APIs 116 of the composition system 114.

A lookaside list is examined by the composition system to determine if a surface is available as allocated in memory of the computing device that corresponds to the received request and that does not include visuals that are valid for display by a display device of the computing device (block 1604). The lookaside list, for instance, may reference surfaces that are allocated in memory but no longer have valid portions, e.g., due to later received updates.

Responsive to the examination that the determined surface is available, the determined surface is made available for rendering of the one or more visuals (block 1606). The determined surface, for instance, may have been allocated a greater size than requested as previously described and therefore be relevant to a subsequent update. A variety of other examples are also contemplated.

Figure 17:
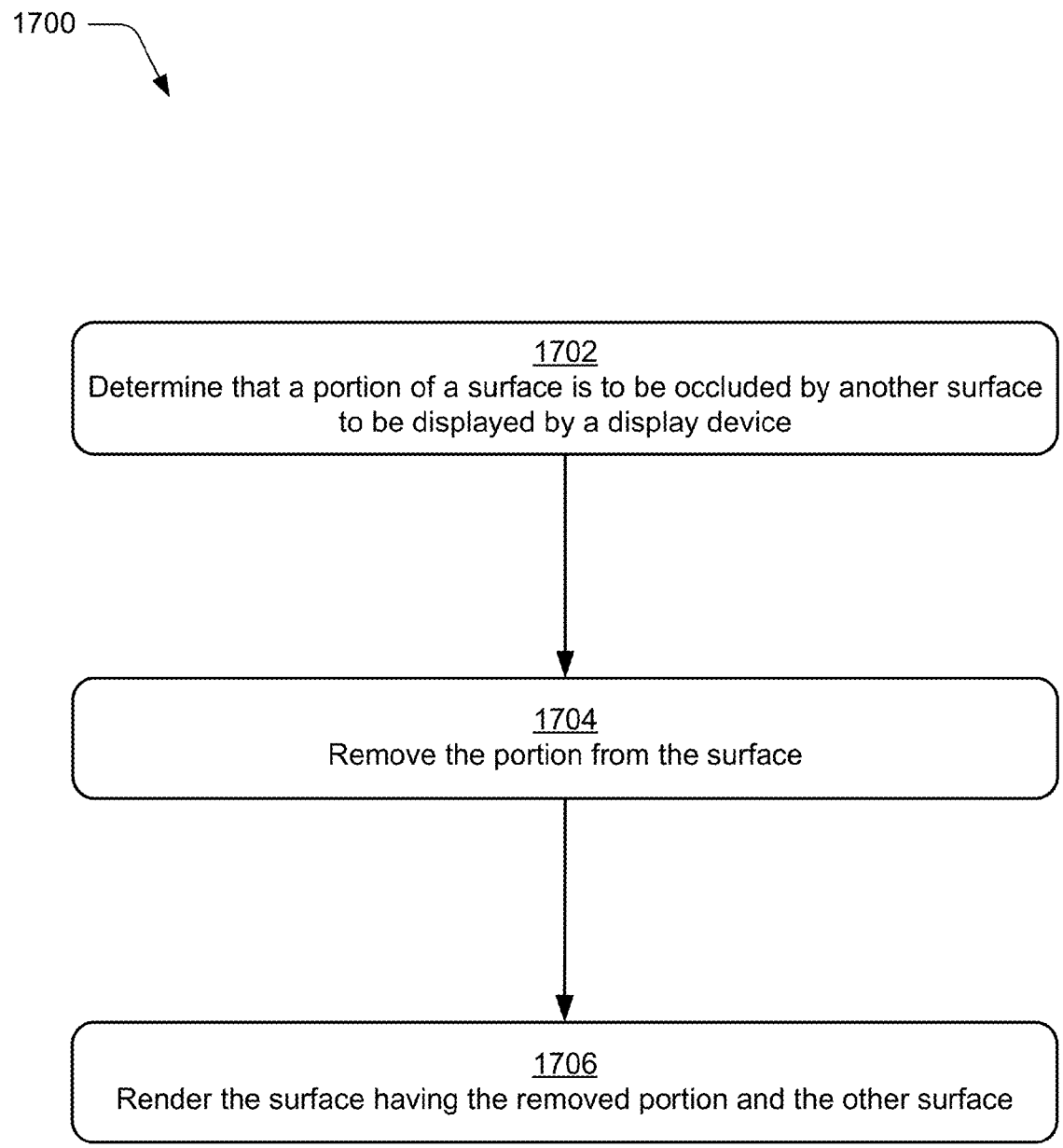
FIG. 17 is a flow diagram depicting a procedure in an example implementation in which a surface is resized based on occlusion.

FIG. 17 depicts a procedure 1700 in an example implementation in which a surface is resized based on occlusion. A determination is made that a portion of a surface is to be occluded by another surface to be displayed by a display device (block 1702). The composition engine 402, for instance, may determine a z-order for display of the surfaces and determine that at least part of other surface is to be rendered over the portion of the surface.

The portion is removed from the surface (block 1704). This may be performed in a variety of ways, such as by using an edge of the other surface to define an edge of the surface that is to be reduced, thereby defining at least one new edge of the surface.

The surface having the removed portion is rendered along with the other surface (block 1706). In this way, rendering of the portion that is removed from the surface may be avoided, thereby conserving resources of the computing device 102.

FIG. 18 depicts a procedure 1800 in an example implementation in which a compaction technique is described that involves push down of a valid region from one surface to another. Valid regions of a plurality of surfaces are tracked that are usable by a composition system to render one or more visuals (block 1802). The composition system 114, for instance, may determine which parts of a surface are and are not to be displayed by a display device.

A determination is then made by the composition system that a first valid region of a first surface is includable within an allocation of a second surface (block 1804). The first surface, for instance, may be configured as an update. Subsequent updates may then be performed that make portions of the update invalid other than the first valid region.

The first valid region is then pushed down for inclusion as part of the second surface (block 1806). This may including copying bits of the valid region to the second surface. After the copying, the first surface may then be released thereby conserving resources in maintaining separate surfaces as well as improving efficiency of rendering operations through use of a smaller number of surfaces. Thus, in this example a new surface is not allocated, thereby saving resources of the computing device 102 in making and maintaining the allocation. Other examples are also contemplated, an example of which is described as follows.

Figure 19:
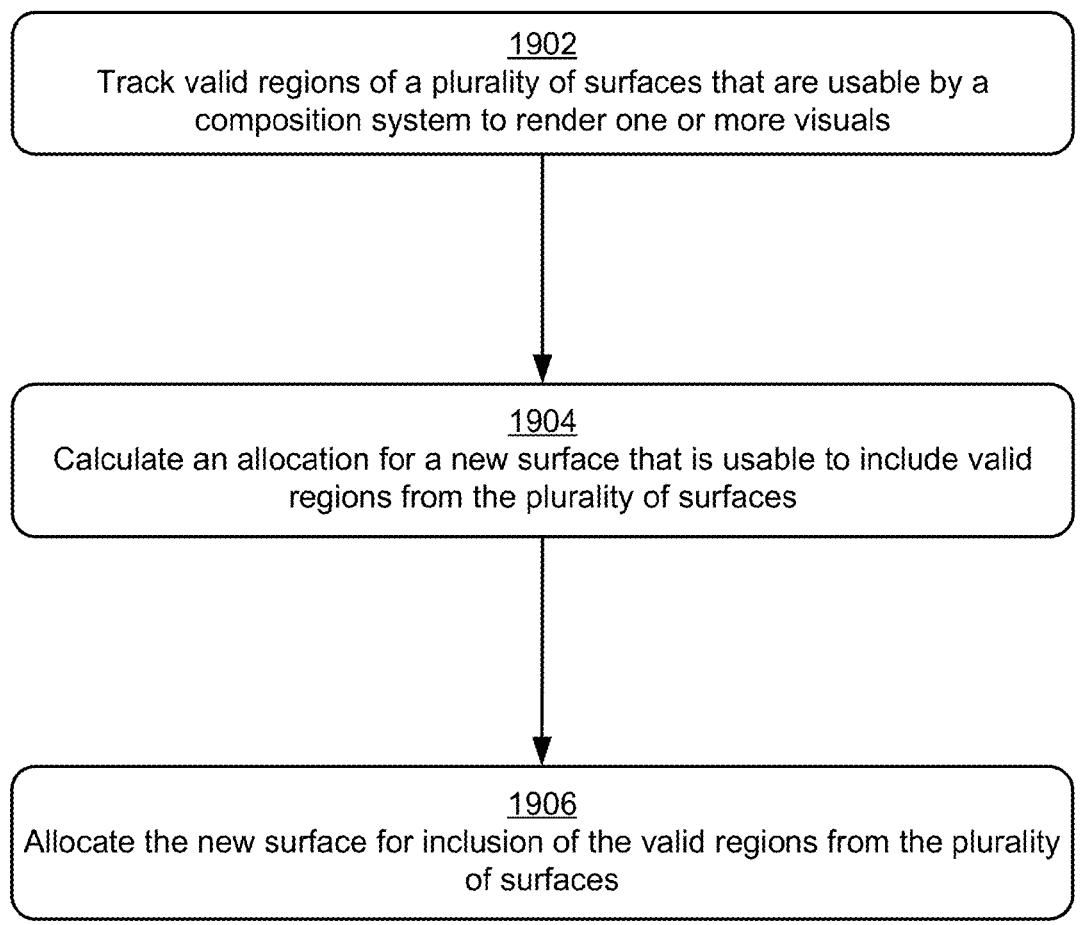
FIG. 19 is a flow diagram depicting a procedure in an example implementation in which a compaction technique is described that involves combining valid regions into a new surface.

FIG. 19 depicts a procedure 1900 in an example implementation in which a compaction technique is described that involves combining valid regions into a new surface. Valid regions of a plurality of surfaces are tracked that are usable by a composition system to render one or more visuals (block 1902). As before, the composition system 114 may determine which parts of a plurality of surfaces are and are not to be displayed by a display device.

An allocation is then calculated for a new surface that is usable to include valid regions from the plurality of surfaces (block 1904). The new surface, for instance, may be configured as a rectangle having bounds for inclusion of a plurality of valid regions. The new surface may then be allocated for inclusion of the valid regions from the plurality of surfaces (block 1906) and the valid regions may then be copied to the new surface, thereby enabling the composition system 115 to free the originating surfaces. A variety of other examples are also contemplated of surface compaction by the composition system 114.

FIG. 20 depicts a procedure 2000 in an example implementation in which the composition system 114 employs a mesh to make a call to a driver to render of surface using the mesh. A mesh is formed out of a set of rectangles that does not include T-junctions (block 2002). The mesh for instance, may be formed as describe a set of triangles that are formed to avoid T-junctions and thus complications encountered in rendering those junctions (e.g., seams) as previously described. A call is made to a driver to render a surface using the mesh (block 2004), such as a single call to a driver of graphics functionality (e.g., a GPU) that may be used to describe a plurality of rectangles having valid regions for update in a user interface. Thus, the mesh may help to avoid use of a call for each of the rectangles used to form the triangles of the mesh as described in the corresponding section above.

Example System and Device

Figure 21:
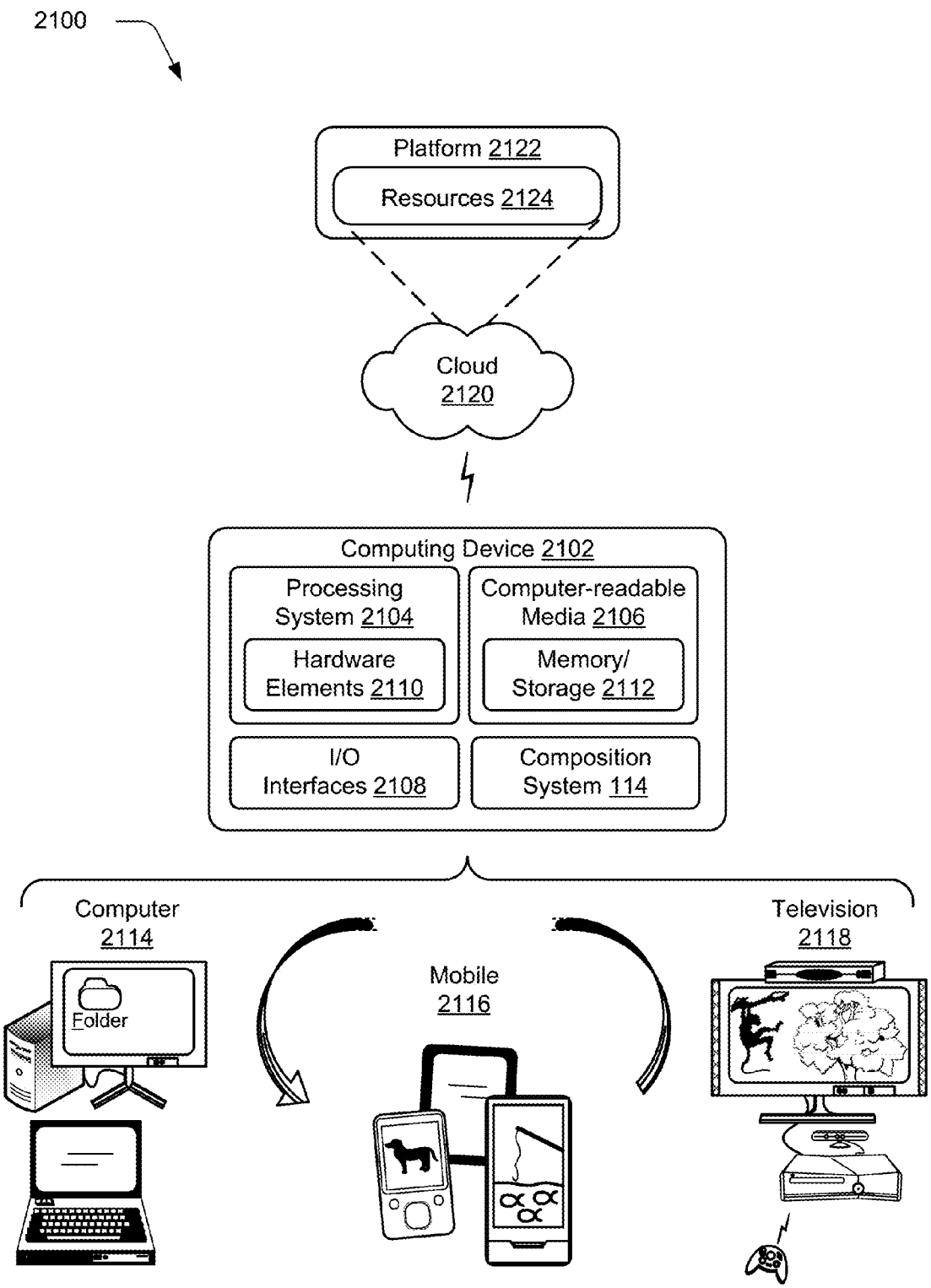
FIG. 21 illustrates an example system including various components of an example device that can be implemented as any type of computing device as described with reference to FIGS. 1-20 to implement embodiments of the techniques described herein.

FIG. 21 illustrates an example system generally at 2100 that includes an example computing device 2102 that is representative of one or more computing systems and/or devices that may implement the various techniques described herein. The computing device 2102 may be, for example, a server of a service provider, a device associated with a client (e.g., a client device), an on-chip system, and/or any other suitable computing device or computing system. The computing device 2102 is illustrated as including the composition system 114 of FIG. 1.

The example computing device 2102 as illustrated includes a processing system 2104, one or more computer-readable media 2106, and one or more I/O interface 2108 that are communicatively coupled, one to another. Although not shown, the computing device 2102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2104 is representative of functionality to perform one or more operations using hardware. Accordingly, the processing system 2104 is illustrated as including hardware element 2110 that may be configured as processors, functional blocks, and so forth. This may include implementation in hardware as an application specific integrated circuit or other logic device formed using one or more semiconductors. The hardware elements 2110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2106 is illustrated as including memory/storage 2112. The memory/storage 2112 represents memory/storage capacity associated with one or more computer-readable media. The memory/storage component 2112 may include volatile media (such as random access memory (RAM)) and/or nonvolatile media (such as read only memory (ROM), Flash memory, optical disks, magnetic disks, and so forth). The memory/storage component 2112 may include fixed media (e.g., RAM, ROM, a fixed hard drive, and so on) as well as removable media (e.g., Flash memory, a removable hard drive, an optical disc, and so forth). The computer-readable media 2106 may be configured in a variety of other ways as further described below.

Input/output interface(s) 2108 are representative of functionality to allow a user to enter commands and information to computing device 2102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2110 and computer-readable media 2106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2110. The computing device 2102 may be configured to implement particular instructions and/or functions corresponding to the software and/or hardware modules. Accordingly, implementation of a module that is executable by the computing device 2102 as software may be achieved at least partially in hardware, e.g., through use of computer-readable storage media and/or hardware elements 2110 of the processing system 2104. The instructions and/or functions may be executable/operable by one or more articles of manufacture (for example, one or more computing devices 2102 and/or processing systems 2104) to implement techniques, modules, and examples described herein.

As further illustrated in FIG. 21, the example system 2100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 2100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 2102 may assume a variety of different configurations, such as for computer 2114, mobile 2116, and television 2118 uses. Each of these configurations includes devices that may have generally different constructs and capabilities, and thus the computing device 2102 may be configured according to one or more of the different device classes. For instance, the computing device 2102 may be implemented as the computer 2114 class of a device that includes a personal computer, desktop computer, a multi-screen computer, laptop computer, netbook, and so on.

The computing device 2102 may also be implemented as the mobile 2116 class of device that includes mobile devices, such as a mobile phone, portable music player, portable gaming device, a tablet computer, a multi-screen computer, and so on. The computing device 2102 may also be implemented as the television 2118 class of device that includes devices having or connected to generally larger screens in casual viewing environments. These devices include televisions, set-top boxes, gaming consoles, and so on.

The techniques described herein may be supported by these various configurations of the computing device 2102 and are not limited to the specific examples of the techniques described herein. This functionality may also be implemented all or in part through use of a distributed system, such as over a "cloud" 2120 via a platform 2122 as described below.

The cloud 2120 includes and/or is representative of a platform 2122 for resources 2124. The platform 2122 abstracts underlying functionality of hardware (e.g., servers) and software resources of the cloud 2120. The resources 2124 may include applications and/or data that can be utilized while computer processing is executed on servers that are remote from the computing device 2102. Resources 2124 can also include services provided over the Internet and/or through a subscriber network, such as a cellular or Wi-Fi network.

The platform 2122 may abstract resources and functions to connect the computing device 2102 with other computing devices. The platform 2122 may also serve to abstract scaling of resources to provide a corresponding level of scale to encountered demand for the resources 2124 that are implemented via the platform 2122. Accordingly, in an interconnected device embodiment, implementation of functionality described herein may be distributed throughout the system 2100. For example, the functionality may be implemented in part on the computing device 2102 as well as via the platform 2122 that abstracts the functionality of the cloud 2120.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   writing one or more visuals as composition elements including bitmaps and associated compositional metadata by the computing device to a plurality of virtual composition surfaces, each virtual composition surface comprising one or more logical composition surfaces representative of individual surfaces as seen by an application running on the computing device;
   tracking a plurality of valid regions by the computing device within the virtual composition surfaces comprising one or more current visuals;
   determining that a valid region of the plurality of valid regions of a first virtual composition surface of the plurality of virtual composition surfaces by the computing device is includable within a second virtual composition surface of the plurality of virtual composition surfaces; and responsive to the determination, integrating the valid region by the computing device into the second virtual composition surface, wherein the integration of the valid region into the second virtual composition surface comprises copying the valid region into a memory allocation corresponding to the second virtual composition surface.

2. A method as described in claim 1, wherein the current visuals comprise visuals that are to be displayed.

3. A method as described in claim 2, further comprising tracking non-valid regions by the computing device, the non-valid regions comprising visuals that are not to be displayed.

4. A method as described in claim 1, further comprising removing an indication that the valid region is valid by the computing device after integrating the valid region into the second virtual composition surface.

5. A method as described in claim 4, further comprising releasing a memory allocation by the computing device associated with the first virtual composition surface responsive to a determination by the computing device that the first virtual composition surface no longer contains any valid regions.

6. A method as described in claim 1, wherein the second virtual composition surface also contains a plurality of valid regions.

7. A method as described in claim 1, further comprising rendering the second virtual composition surface responsive to the integration of the valid region from the first virtual composition surface.

8. A system comprising:
one or more processors; and
one or more computer readable storage media comprising instructions, that, responsive to execution by the one or more processors, causes a visual composition system to perform operations comprising:
writing one or more visuals as composition elements including bitmaps and associated compositional metadata to a plurality of virtual composition surfaces, each virtual composition surface comprising one or more logical composition surfaces representative of individual surfaces as seen by an application;
tracking a plurality of valid regions within the virtual composition surfaces comprising one or more current visuals;
determining that a first said valid region of a first said virtual composition surface is combinable with a second said valid region of a second said virtual composition surface; and
responsive to the determination, creating a new virtual composition surface for inclusion of the first and second valid regions, and copying the first and second valid regions to the new virtual composition surface, wherein the copying of the first and second valid regions into the new virtual composition surface comprises copying the first and second valid regions into a memory allocation corresponding to the new virtual composition surface.

9. A system as described in claim 8, wherein the operations further comprise removing an indication that the first and second valid regions are valid after the first and second valid regions are copied to the new virtual composition surface.

10. A system as described in claim 9, wherein the operations further comprise releasing a memory allocation associated with the first or second virtual composition surface responsive to a determination that the first or second virtual composition surface no longer contains any valid regions.

11. A system as described in claim 8, further comprising rendering the new virtual composition surface with the first and second valid regions responsive to the first and second valid regions being copied into the new virtual composition surface.

12. One or more computer-readable storage media devices comprising instructions stored thereon, that, responsive to execution by one or more processors of a computing device, causes the computing device to implement a composition system to perform operations comprising:
writing one or more visuals as composition elements including bitmaps and associated compositional metadata to a plurality of virtual composition surfaces, each virtual composition surface comprising one or more logical composition surfaces representative of individual surfaces as seen by an application running on the computing device;
tracking a plurality of valid regions within the virtual composition surfaces comprising one or more current visuals;
determining that a valid region of the plurality of valid regions of a first virtual composition surface of the plurality of virtual composition surfaces is includable within a second virtual composition surface of the plurality of virtual composition surfaces; and
responsive to the determination, integrating the valid region into the second virtual composition surface, wherein the integration of the valid region into the second virtual composition surface comprises copying the valid region into a memory allocation corresponding to the second virtual composition surface.

13. One or more computer-readable storage media devices as described in claim 12, wherein the current visuals comprise visuals that are to be displayed.

14. One or more computer-readable storage media devices as described in claim 13, further comprising tracking non-valid regions by the computing device, the non-valid regions comprising visuals that are not to be displayed.

15. One or more computer-readable storage media devices as described in claim 12, further comprising removing an indication that the valid region is valid by the computing device after integrating the valid region into the second virtual composition surface.

16. One or more computer-readable storage media devices as described in claim 15, further comprising releasing a memory allocation by the computing device associated with the first virtual composition surface responsive to a determination by the computing device that the first virtual composition surface no longer contains any valid regions.

* * * * *